United States Patent
Chen et al.

(10) Patent No.: US 9,591,644 B2
(45) Date of Patent: Mar. 7, 2017

(54) DOWNLINK PROCEDURES FOR LTE/LTE-A COMMUNICATION SYSTEMS WITH UNLICENSED SPECTRUM

(71) Applicant: QUALCOMM Incorporated, San Diego, CA (US)

(72) Inventors: Wanshi Chen, San Diego, CA (US); Peter Gaal, San Diego, CA (US); Durga Prasad Malladi, San Diego, CA (US); Tao Luo, San Diego, CA (US); Aleksandar Damnjanovic, Del Mar, CA (US); Naga Bhushan, San Diego, CA (US); Tingfang Ji, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 14/459,651

(22) Filed: Aug. 14, 2014

(65) Prior Publication Data
US 2015/0049741 A1   Feb. 19, 2015

Related U.S. Application Data

(60) Provisional application No. 61/866,905, filed on Aug. 16, 2013.

(51) Int. Cl.
*H04W 72/04*  (2009.01)
*H04W 56/00*  (2009.01)
(Continued)

(52) U.S. Cl.
CPC ....... *H04W 72/0453* (2013.01); *H04W 48/08* (2013.01); *H04W 48/12* (2013.01);
(Continued)

(58) Field of Classification Search
None
See application file for complete search history.

(56) References Cited

U.S. PATENT DOCUMENTS

2005/0036571 A1 * 2/2005 Shvodian ................ H04B 1/69
375/316
2010/0208681 A1 * 8/2010 Elmaleh ................ H04W 16/14
370/329
(Continued)

FOREIGN PATENT DOCUMENTS

WO   WO/2012/141463   * 10/2012
WO   WO-2013006006 A2   1/2013
(Continued)

OTHER PUBLICATIONS

International Search Report and Written Opinion—PCT/US2014/051184—ISA/EPO—Feb. 25, 2015.

*Primary Examiner* — Christine Duong
(74) *Attorney, Agent, or Firm* — Norton Rose Fulbright US LLP

(57) ABSTRACT

Long term evolution (LTE)/LTE-Advanced (LTE-A) deployments with unlicensed spectrum leverage more efficient LTE communication aspects over unlicensed spectrum, such as over WIFI radio access technology. In order to accommodate such communications, various downlink procedures may be modified in order to handle communications between licensed and unlicensed spectrum with LTE/LTE-A deployments with unlicensed spectrum.

30 Claims, 17 Drawing Sheets

(51) Int. Cl.
*H04W 48/12* (2009.01)
*H04W 48/08* (2009.01)
*H04W 48/16* (2009.01)

(52) U.S. Cl.
CPC ....... *H04W 56/00* (2013.01); *H04W 56/0005* (2013.01); *H04W 56/0015* (2013.01); *H04W 48/16* (2013.01)

(56) References Cited

U.S. PATENT DOCUMENTS

| | | |
|---|---|---|
| 2014/0112289 A1 | 4/2014 | Kim et al. |
| 2014/0161002 A1* | 6/2014 | Gauvreau ............ H04W 16/24 370/280 |

FOREIGN PATENT DOCUMENTS

| | | |
|---|---|---|
| WO | WO-2013010323 A1 | 1/2013 |
| WO | WO-2013063808 A1 | 5/2013 |
| WO | WO-2013071506 A1 | 5/2013 |

* cited by examiner

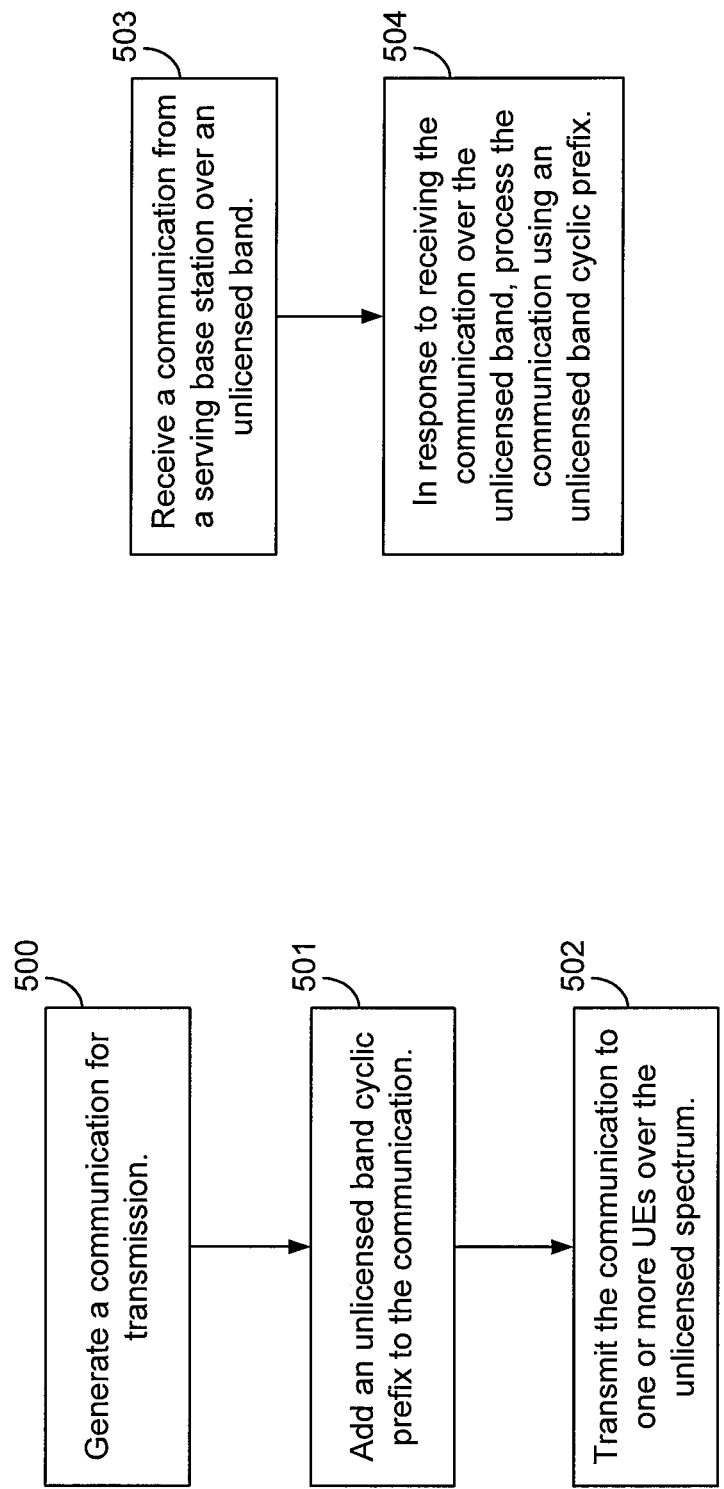

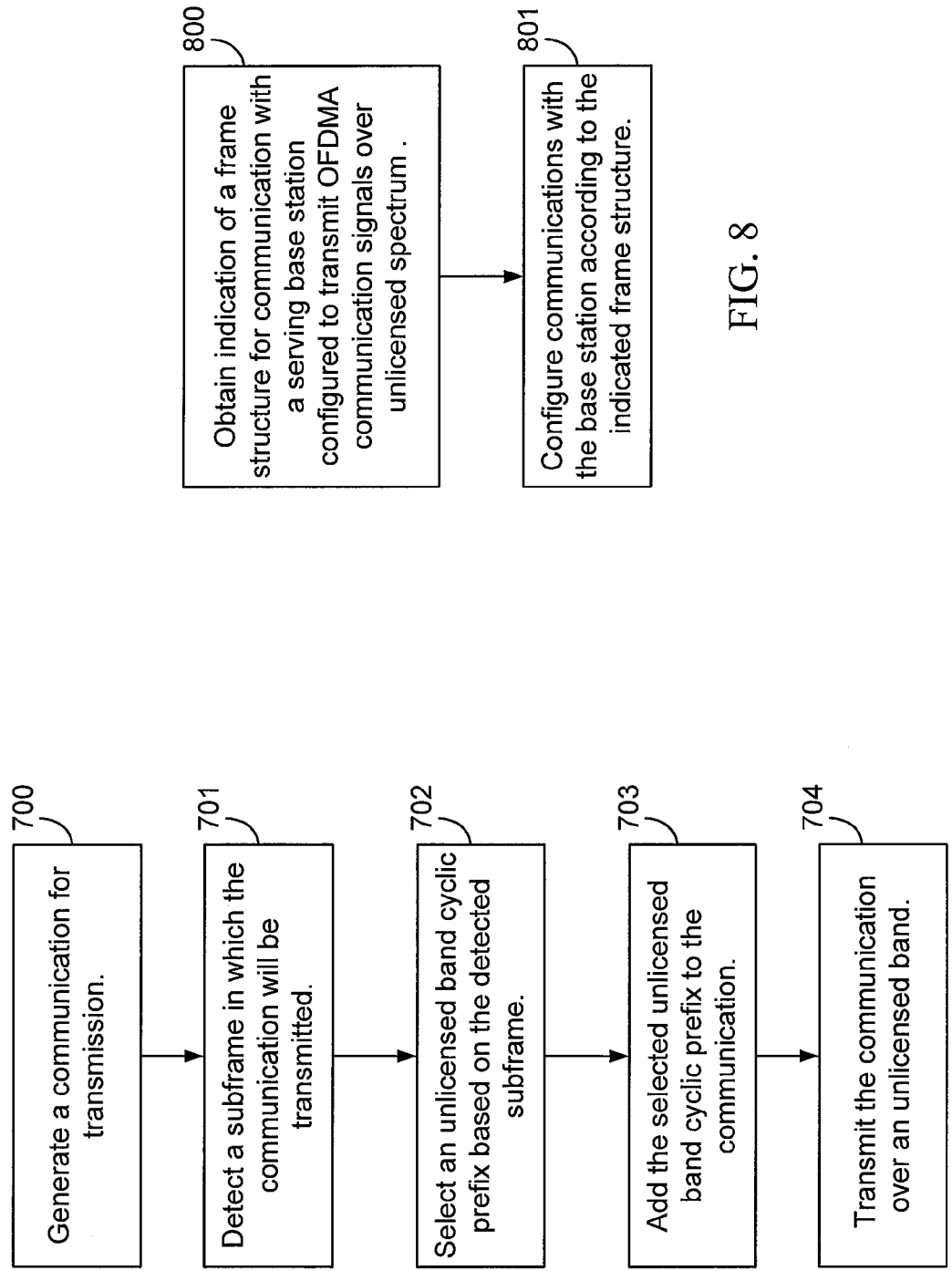

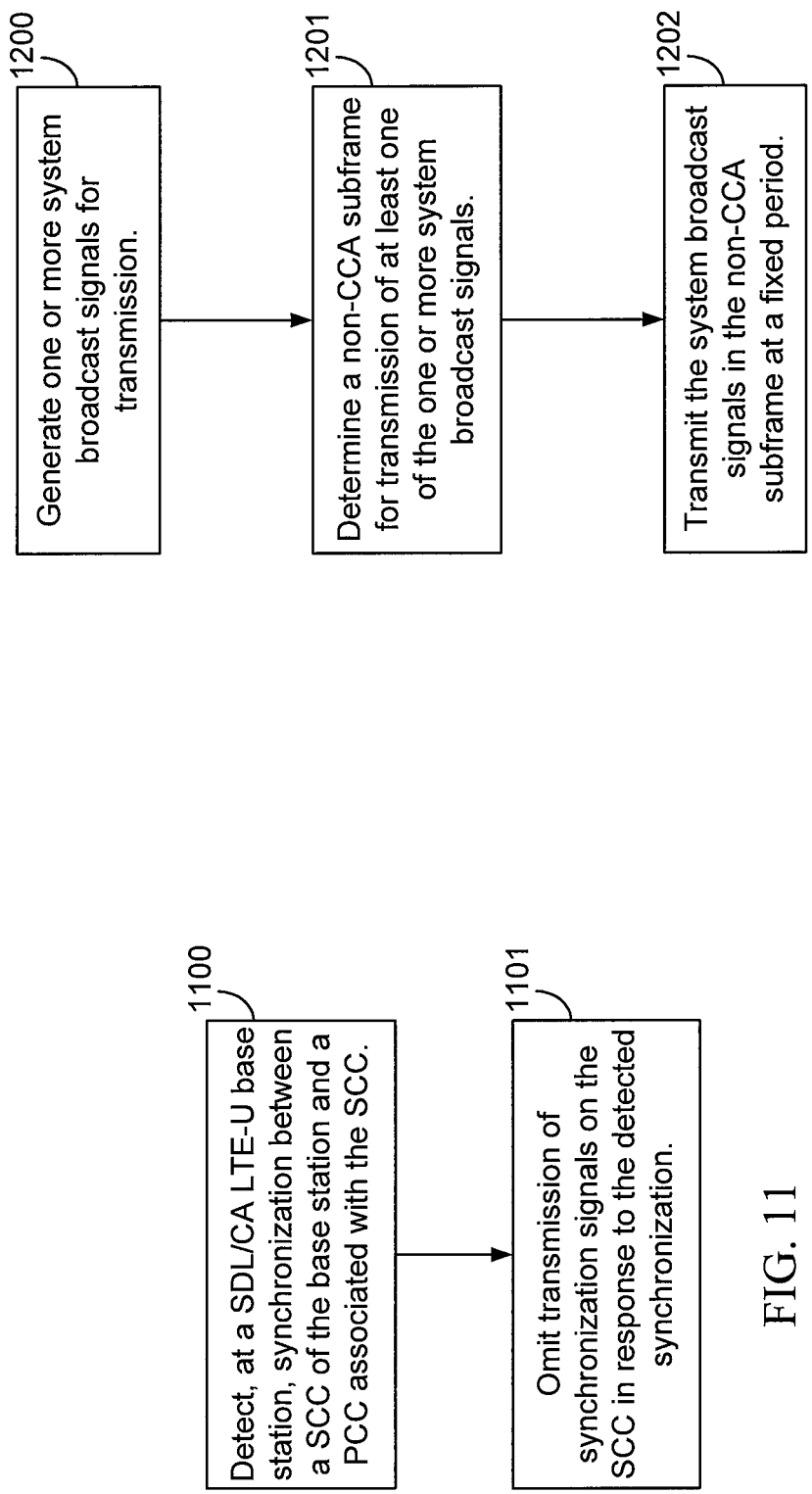

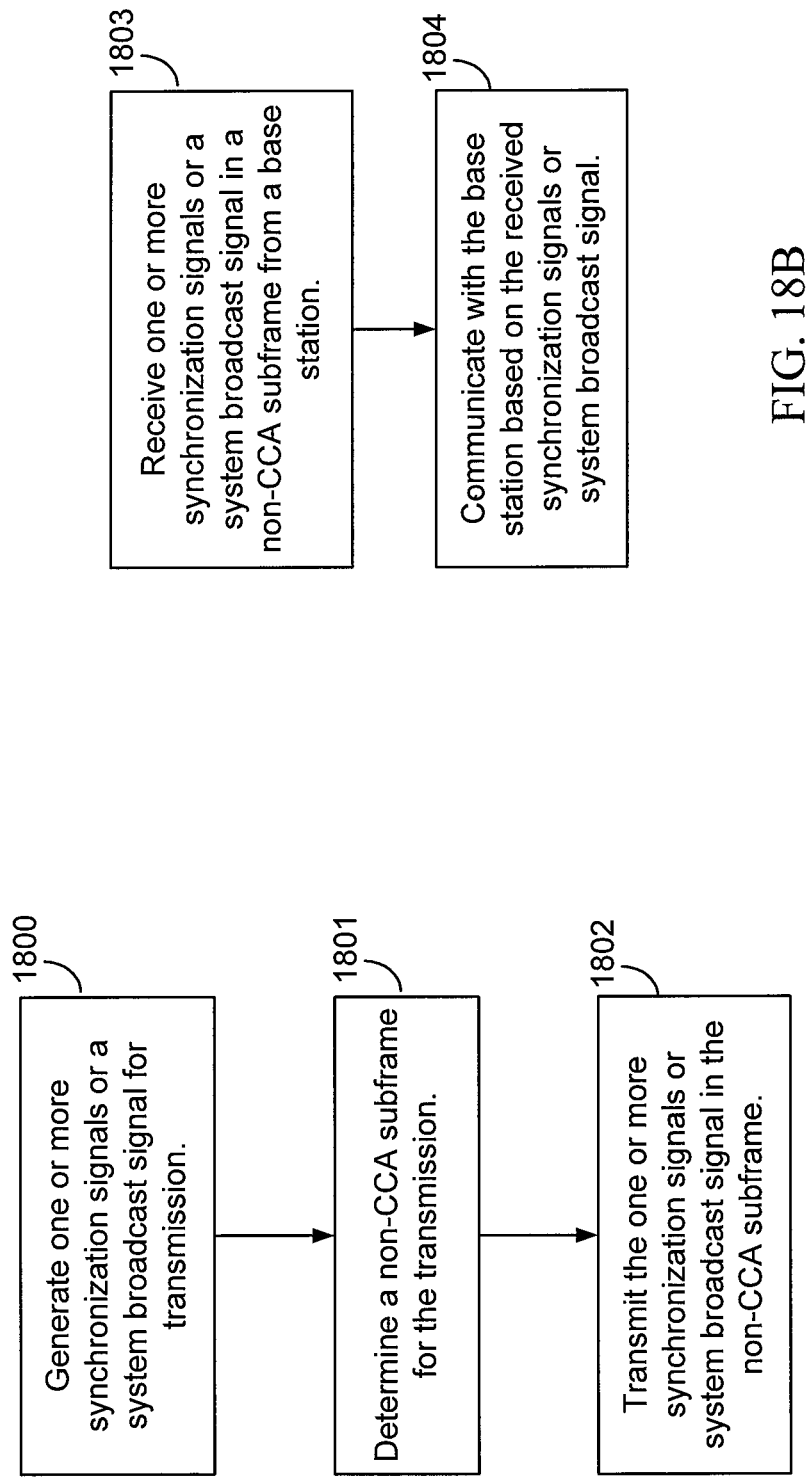

DOWNLINK PROCEDURES FOR LTE/LTE-A COMMUNICATION SYSTEMS WITH UNLICENSED SPECTRUM

CROSS-REFERENCE TO RELATED APPLICATIONS

This application claims the benefit of U.S. Provisional Patent Application No. 61/866,905, entitled, "DOWNLINK PROCEDURES FOR LTE-U COMMUNICATION SYSTEMS", filed on Aug. 16, 2013, which is expressly incorporated by reference herein in its entirety.

BACKGROUND

Field

Aspects of the present disclosure relate generally to wireless communication systems, and more particularly, to downlink procedures for long term evolution (LTE)/LTE-Advanced (LTE-A) communication systems with unlicensed spectrum.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes generating, at a base station configured to transmit orthogonal frequency divisional multiple access (OFDMA) communication signals over at least unlicensed spectrum, at least one of: one or more synchronization signals, or a system broadcast signal for transmission, determining, by the base station, a non-clear channel assessment (non-CCA) subframe for transmission of the at least one of: the one or more synchronization signals, or the system broadcast signal, and transmitting, by the base station, the at least one of: the one or more synchronization signals, or the system broadcast signal in the non-CCA subframe.

In an additional aspect of the disclosure, a method of wireless communication includes receiving, at a user equipment configured to receive OFDMA communication signals over at least unlicensed spectrum, at least one of: one or more synchronization signals, or a system broadcast signal in a non-CCA subframe from a base station, and communicating, by the user equipment, with the base station based on the received at least one of: one or more synchronization signals, or a system broadcast signal.

In an additional aspect of the disclosure, an apparatus configured for wireless communication includes at least one processor and a memory coupled to the at least one processor. The at least one processor is configured to generate, at a base station configured to transmit OFDMA communication signals over at least unlicensed spectrum, at least one of: one or more synchronization signals, or a system broadcast signal for transmission. The at least one processor is additionally configured to determine, by the base station, a non-CCA subframe for transmission of the at least one of: the one or more synchronization signals, or the system broadcast signal. The at least one processor is also configured to transmit, by the base station, the at least one of: the one or more synchronization signals, or the system broadcast signal in the non-CCA subframe.

In an additional aspect of the disclosure, an apparatus configured for wireless communication includes at least one processor and a memory coupled to the at least one processor. The at least one processor is configured to receive, at a user equipment configured to receive OFDMA communication signals over at least unlicensed spectrum, at least one of: one or more synchronization signals, or a system broadcast signal in a non-CCA subframe from a base station. The at least one processor is additionally configured to communicate, by the user equipment, with the base station based on the received at least one of: one or more synchronization signals, or a system broadcast signal.

BRIEF DESCRIPTION OF THE DRAWINGS

FIG. 1 shows a diagram that illustrates an example of a wireless communications system according to various embodiments.

FIG. 2A shows a diagram that illustrates examples of deployment scenarios for using LTE in an unlicensed spectrum according to various embodiments.

FIG. 2B shows a diagram that illustrates another example of a deployment scenario for using LTE in an unlicensed spectrum according to various embodiments.

FIGS. 5A and 5B are functional block diagram illustrating example blocks executed to implement one aspect of the present disclosure.

FIG. 7 is a functional block diagram illustrating example blocks executed to implement one aspect of the present disclosure.

FIG. 8 is a functional block diagram illustrating example blocks executed to implement one aspect of the present disclosure.

FIG. 11 is a functional block diagram illustrating example blocks executed to implement one aspect of the present disclosure.

FIG. 12 is a functional block diagram illustrating example blocks executed to implement one aspect of the present disclosure.

FIGS. 18A and 18B are functional block diagrams illustrating example blocks executed to implement one aspect of the present disclosure.

DETAILED DESCRIPTION

Figure 1:
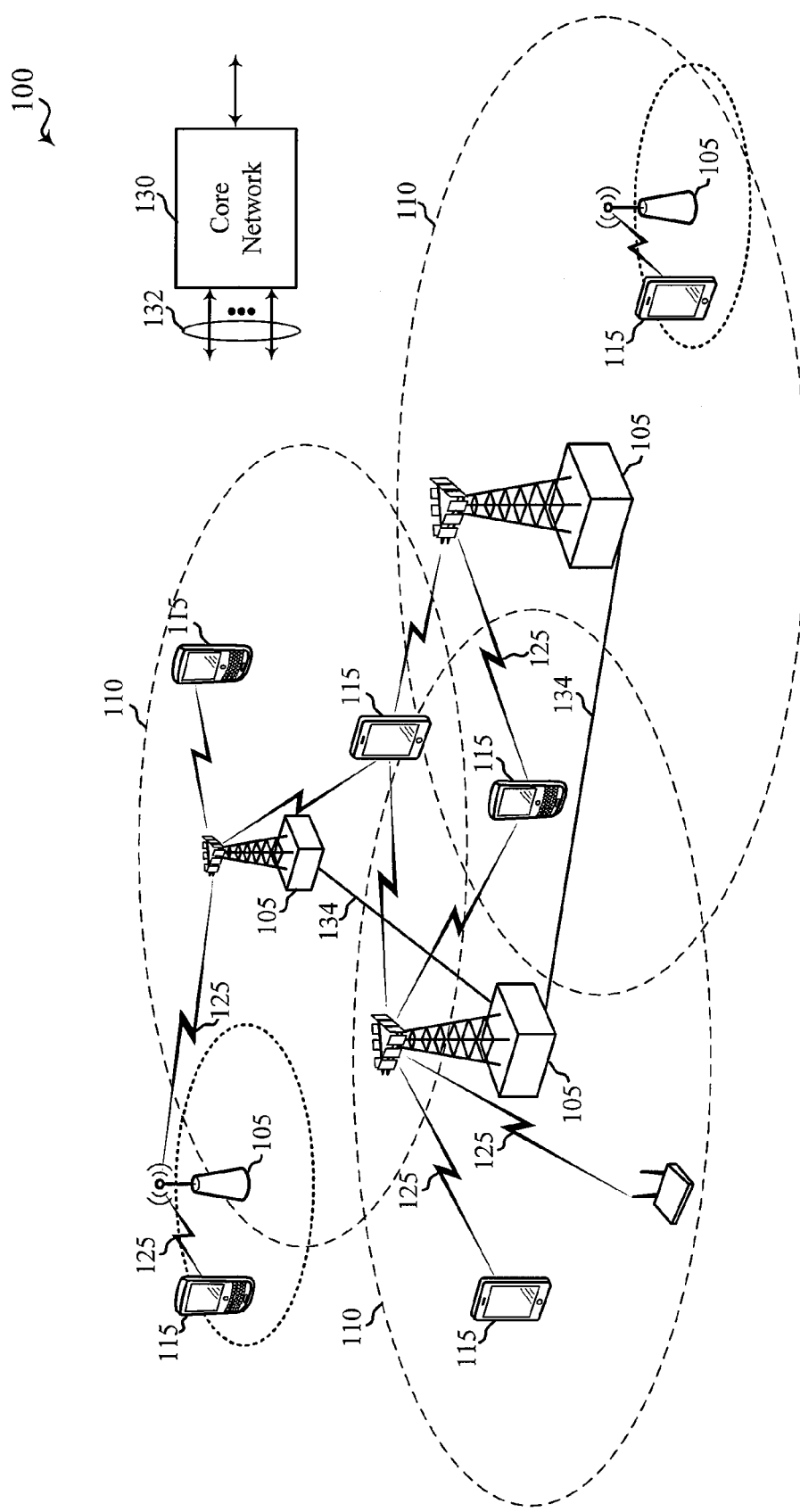

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Operators have so far looked at WIFI as the primary mechanism to use unlicensed spectrum to relieve ever increasing levels of congestion in cellular networks. However, a new carrier type (NCT) based on LTE/LTE-A in an unlicensed spectrum may be compatible with carrier-grade WIFI, making LTE/LTE-A with unlicensed spectrum an alternative to WIFI. LTE/LTE-A with unlicensed spectrum may leverage LTE concepts and may introduce some modifications to physical layer (PHY) and media access control (MAC) aspects of the network or network devices to provide efficient operation in the unlicensed spectrum and to meet regulatory requirements. The unlicensed spectrum may range from 600 Megahertz (MHz) to 6 Gigahertz (GHz), for example. In some scenarios, LTE/LTE-A with unlicensed spectrum may perform significantly better than WIFI. For example, an all LTE/LTE-A deployment with unlicensed spectrum (for single or multiple operators) compared to an all WIFI deployment, or when there are dense small cell deployments, LTE/LTE-A with unlicensed spectrum may perform significantly better than WIFI. LTE/LTE-A with unlicensed spectrum may perform better than WIFI in other scenarios such as when LTE/LTE-A with unlicensed spectrum is mixed with WIFI (for single or multiple operators).

For a single service provider (SP), an LTE/LTE-A network with unlicensed spectrum may be configured to be synchronous with a LTE network on the licensed spectrum. However, LTE/LTE-A networks with unlicensed spectrum deployed on a given channel by multiple SPs may be configured to be synchronous across the multiple SPs. One approach to incorporate both the above features may involve using a constant timing offset between LTE/LTE-A with and without unlicensed spectrum for a given SP. An LTE/LTE-A network with unlicensed spectrum may provide unicast and/or multicast services according to the needs of the SP. Moreover, LTE/LTE-A network with unlicensed spectrum may operate in a bootstrapped mode in which LTE cells act as anchor and provide relevant unlicensed spectrum cell information (e.g., radio frame timing, common channel configuration, system frame number or SFN, etc.). In this mode, there may be close interworking between LTE/LTE-A with and without unlicensed spectrum. For example, the bootstrapped mode may support the supplemental downlink and the carrier aggregation modes described above. The PHY-MAC layers of the LTE/LTE-A network with unlicensed spectrum may operate in a standalone mode in which the LTE/LTE-A network with unlicensed spectrum operates independently from an LTE network. In this case, there may be a loose interworking between LTE/LTE-A with and without unlicensed spectrum based on RLC-level aggregation with co-located licensed and unlicensed cells, or multiflow across multiple cells and/or base stations, for example.

The techniques described herein are not limited to LTE, and may also be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system or network 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

In some embodiments, the system 100 is an LTE/LTE-A network that supports one or more communication modes of operation or deployment scenarios over an unlicensed spectrum. In other embodiments, the system 100 may support wireless communications using an unlicensed spectrum and an access technology different from LTE/LTE-A with unlicensed spectrum, or a licensed spectrum and an access technology different from LTE/LTE-A. The terms evolved Node B (eNB) and user equipment (UE) may be generally used to describe the base stations 105 and devices 115, respectively. The system 100 may be a Heterogeneous LTE/LTE-A network with or without licensed spectrum in which different types of eNBs provide coverage for various geographical regions. For example, each eNB 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 are dispersed throughout the system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communications links 125 shown in system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The downlink transmissions may be made using a licensed spectrum, an unlicensed spectrum, or both. Similarly, the uplink transmissions may be made using a licensed spectrum, an unlicensed spectrum, or both.

In some embodiments of the system 100, various deployment scenarios for LTE/LTE-A with unlicensed spectrum may be supported including a supplemental downlink (SDL) mode in which LTE downlink capacity in a licensed spectrum may be offloaded to an unlicensed spectrum, a carrier aggregation mode in which both LTE downlink and uplink capacity may be offloaded from a licensed spectrum to an unlicensed spectrum, and a standalone mode in which LTE downlink and uplink communications between a base station (e.g., eNB) and a UE may take place in an unlicensed spectrum. Base stations 105 as well as UEs 115 may support one or more of these or similar modes of operation. OFDMA communications signals may be used in the communications links 125 for LTE downlink transmissions in an unlicensed spectrum, while SC-FDMA communications signals may be used in the communications links 125 for LTE uplink transmissions in an unlicensed spectrum. Additional details regarding the implementation of LTE/LTE-A deployment scenarios or modes of operation with unlicensed spectrum in a system such as the system 100, as well as other features and functions related to the operation of LTE/LTE-A with unlicensed spectrum, are provided below with reference to FIGS. 2A-18B.

Figure 2A:
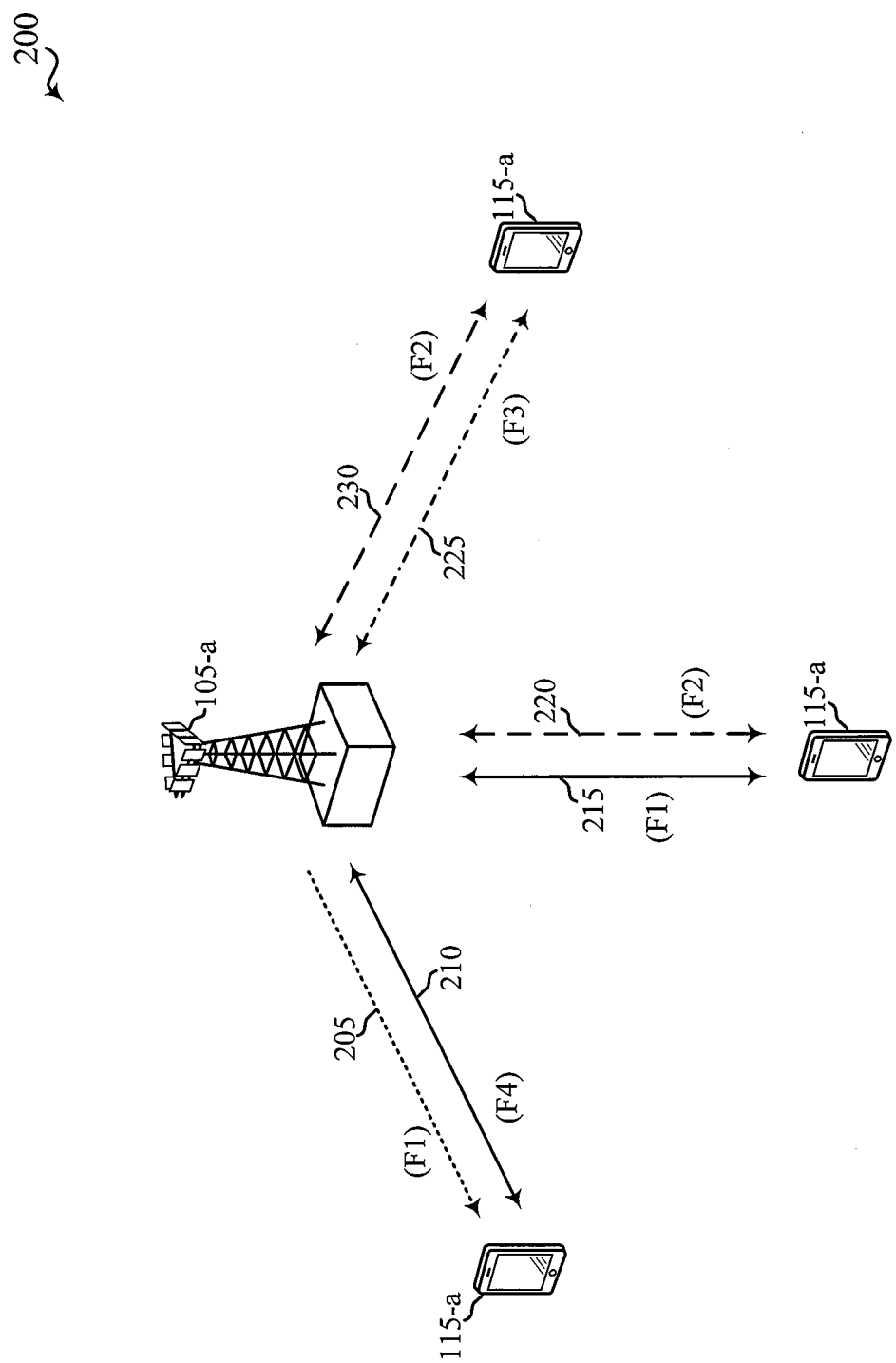

Turning next to FIG. 2A, a diagram 200 shows examples of a supplemental downlink mode and of a carrier aggregation mode for an LTE network that supports LTE/LTE-A with unlicensed spectrum. The diagram 200 may be an example of portions of the system 100 of FIG. 1. Moreover, the base station 105-*a* may be an example of the base stations 105 of FIG. 1, while the UEs 115-*a* may be examples of the UEs 115 of FIG. 1.

In the example of a supplemental downlink mode in diagram 200, the base station 105-*a* may transmit OFDMA communications signals to a UE 115-*a* using a downlink 205. The downlink 205 is associated with a frequency F1 in an unlicensed spectrum. The base station 105-*a* may transmit OFDMA communications signals to the same UE 115-*a* using a bidirectional link 210 and may receive SC-FDMA communications signals from that UE 115-*a* using the bidirectional link 210. The bidirectional link 210 is associated with a frequency F4 in a licensed spectrum. The downlink 205 in the unlicensed spectrum and the bidirectional link 210 in the licensed spectrum may operate concurrently. The downlink 205 may provide a downlink capacity offload for the base station 105-*a*. In some embodiments, the downlink 205 may be used for unicast services (e.g., addressed to one UE) services or for multicast services (e.g., addressed to several UEs). This scenario may occur with any service provider (e.g., traditional mobile network operator or MNO) that uses a licensed spectrum and needs to relieve some of the traffic and/or signaling congestion.

In one example of a carrier aggregation mode in diagram 200, the base station 105-*a* may transmit OFDMA communications signals to a UE 115-*a* using a bidirectional link 215 and may receive SC-FDMA communications signals from the same UE 115-*a* using the bidirectional link 215. The bidirectional link 215 is associated with the frequency F1 in the unlicensed spectrum. The base station 105-*a* may also transmit OFDMA communications signals to the same UE 115-*a* using a bidirectional link 220 and may receive SC-FDMA communications signals from the same UE 115-*a* using the bidirectional link 220. The bidirectional link 220 is associated with a frequency F2 in a licensed spectrum. The bidirectional link 215 may provide a downlink and uplink capacity offload for the base station 105-*a*. Like the supplemental downlink described above, this scenario may occur with any service provider (e.g., MNO) that uses a licensed spectrum and needs to relieve some of the traffic and/or signaling congestion.

In another example of a carrier aggregation mode in diagram 200, the base station 105-*a* may transmit OFDMA communications signals to a UE 115-*a* using a bidirectional link 225 and may receive SC-FDMA communications signals from the same UE 115-*a* using the bidirectional link 225. The bidirectional link 225 is associated with the frequency F3 in an unlicensed spectrum. The base station 105-*a* may also transmit OFDMA communications signals to the same UE 115-*a* using a bidirectional link 230 and may receive SC-FDMA communications signals from the same UE 115-*a* using the bidirectional link 230. The bidirectional link 230 is associated with the frequency F2 in the licensed spectrum. The bidirectional link 225 may provide a downlink and uplink capacity offload for the base station 105-*a*. This example and those provided above are presented for illustrative purposes and there may be other similar modes of operation or deployment scenarios that combine LTE/LTE-A with and without unlicensed spectrum for capacity offload.

As described above, the typical service provider that may benefit from the capacity offload offered by using LTE/LTE-A with unlicensed spectrum is a traditional MNO with LTE spectrum. For these service providers, an operational configuration may include a bootstrapped mode (e.g., supplemental downlink, carrier aggregation) that uses the LTE primary component carrier (PCC) on the licensed spectrum and the secondary component carrier (SCC) on the unlicensed spectrum.

In the supplemental downlink mode, control for LTE/LTE-A with unlicensed spectrum may be transported over the LTE uplink (e.g., uplink portion of the bidirectional link 210). One of the reasons to provide downlink capacity offload is because data demand is largely driven by downlink consumption. Moreover, in this mode, there may not be a regulatory impact since the UE is not transmitting in the unlicensed spectrum. There is no need to implement listen-before-talk (LBT) or carrier sense multiple access (CSMA) requirements on the UE. However, LBT may be implemented on the base station (e.g., eNB) by, for example, using a periodic (e.g., every 10 milliseconds) clear channel assessment (CCA) and/or a grab-and-relinquish mechanism aligned to a radio frame boundary.

In the carrier aggregation mode, data and control may be communicated in LTE (e.g., bidirectional links 210, 220, and 230) while data may be communicated in LTE/LTE-A with unlicensed spectrum (e.g., bidirectional links 215 and 225). The carrier aggregation mechanisms supported when using LTE/LTE-A with unlicensed spectrum may fall under a hybrid frequency division duplexing-time division duplexing (FDD-TDD) carrier aggregation or a TDD-TDD carrier aggregation with different symmetry across component carriers.

Figure 2B:
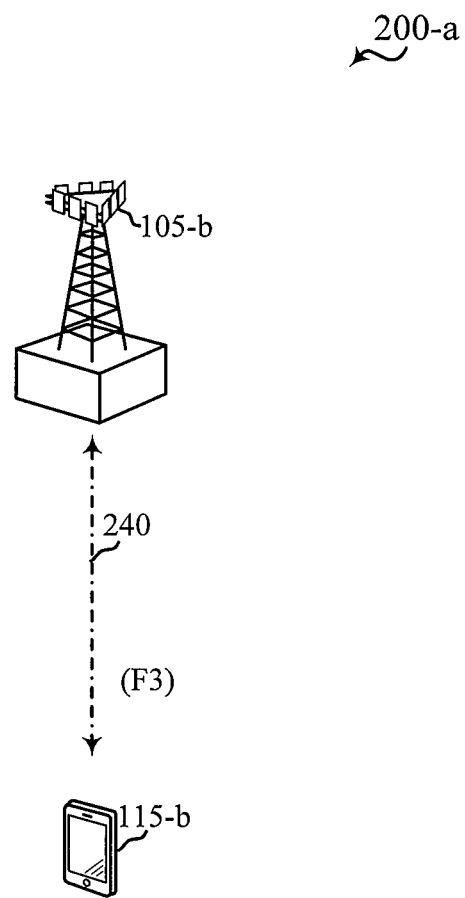

FIG. 2B shows a diagram 200-*a* that illustrates an example of a standalone mode for LTE/LTE-A with unlicensed spectrum. The diagram 200-*a* may be an example of portions of the system 100 of FIG. 1. Moreover, the base station 105-*b* may be an example of the base stations 105 of FIG. 1 and the base station 105-*a* of FIG. 2A, while the UE 115-*b* may be an example of the UEs 115 of FIG. 1 and the UEs 115-*a* of FIG. 2A.

In the example of a standalone mode in diagram 200-*a*, the base station 105-*b* may transmit OFDMA communications signals to the UE 115-*b* using a bidirectional link 240 and may receive SC-FDMA communications signals from the UE 115-*b* using the bidirectional link 240. The bidirectional link 240 is associated with the frequency F3 in an unlicensed spectrum described above with reference to FIG. 2A. The standalone mode may be used in non-traditional wireless access scenarios, such as in-stadium access (e.g., unicast, multicast). The typical service provider for this mode of operation may be a stadium owner, cable company, event hosts, hotels, enterprises, and large corporations that do not have licensed spectrum. For these service providers, an operational configuration for the standalone mode may use the LTE/LTE-A PCC on the unlicensed spectrum. Moreover, LBT may be implemented on both the base station and the UE.

Figure 3:
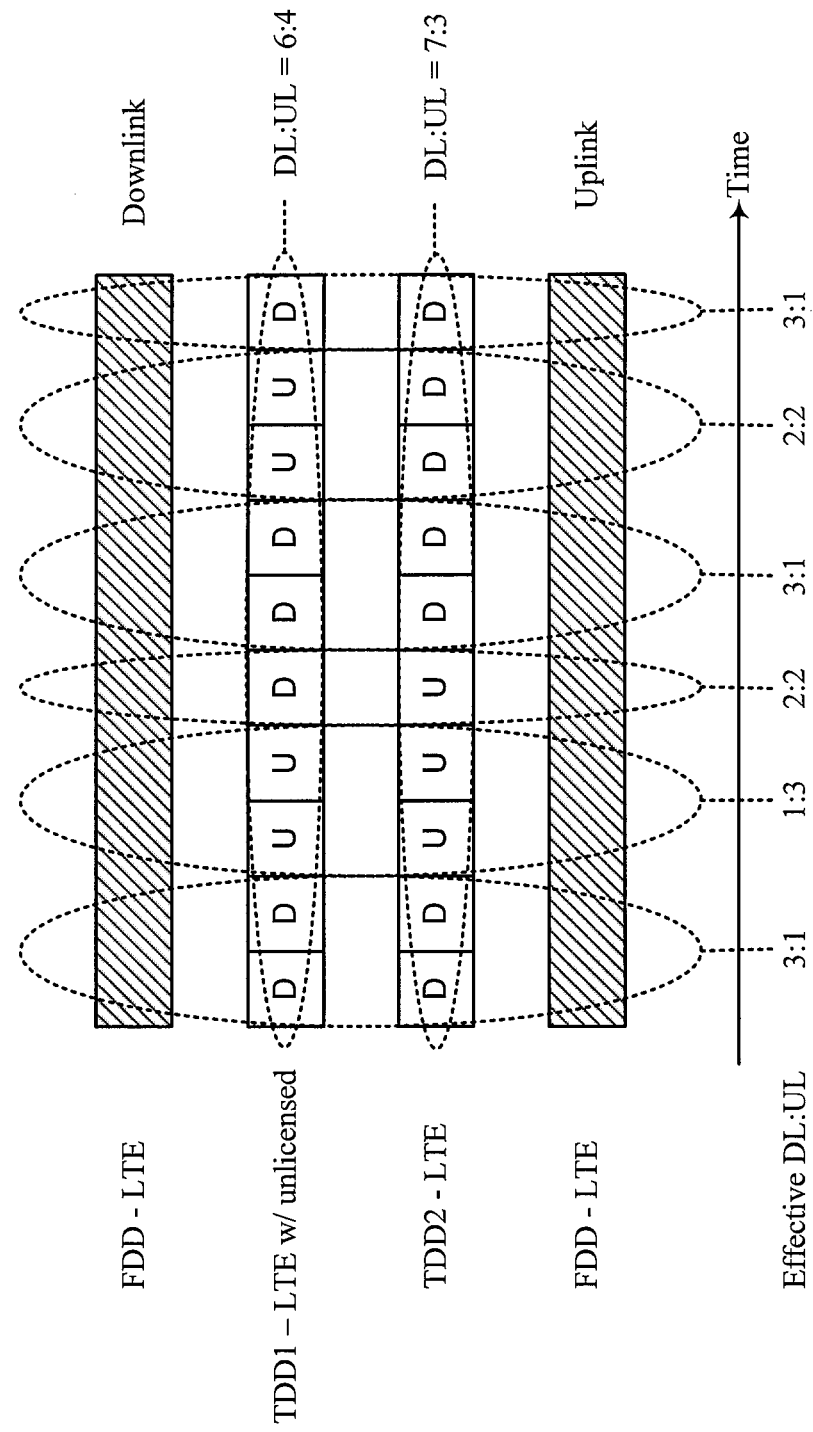
FIG. 3 shows a diagram that illustrates an example of carrier aggregation when using LTE concurrently in licensed and unlicensed spectrum according to various embodiments.

Turning next to FIG. 3, a diagram 300 illustrates an example of carrier aggregation when using LTE concurrently in licensed and unlicensed spectrum according to various embodiments. The carrier aggregation scheme in diagram 300 may correspond to the hybrid FDD-TDD carrier aggregation described above with reference to FIG. 2A. This type of carrier aggregation may be used in at least portions of the system 100 of FIG. 1. Moreover, this type of carrier aggregation may be used in the base stations 105 and 105-*a* of FIG. 1 and FIG. 2A, respectively, and/or in the UEs 115 and 115-*a* of FIG. 1 and FIG. 2A, respectively.

In this example, an FDD (FDD-LTE) may be performed in connection with LTE in the downlink, a first TDD (TDD1) may be performed in connection with LTE/LTE-A with unlicensed spectrum, a second TDD (TDD2) may be performed in connection with LTE, and another FDD (FDD-LTE) may be performed in connection with LTE in the uplink. TDD1 results in a DL:UL ratio of 6:4, while the ratio for TDD2 is 7:3. On the time scale, the different effective DL:UL ratios are 3:1, 1:3, 2:2, 3:1, 2:2, and 3:1. This example is presented for illustrative purposes and there may be other carrier aggregation schemes that combine the operations of LTE/LTE-A with and without unlicensed spectrum.

Figure 4:
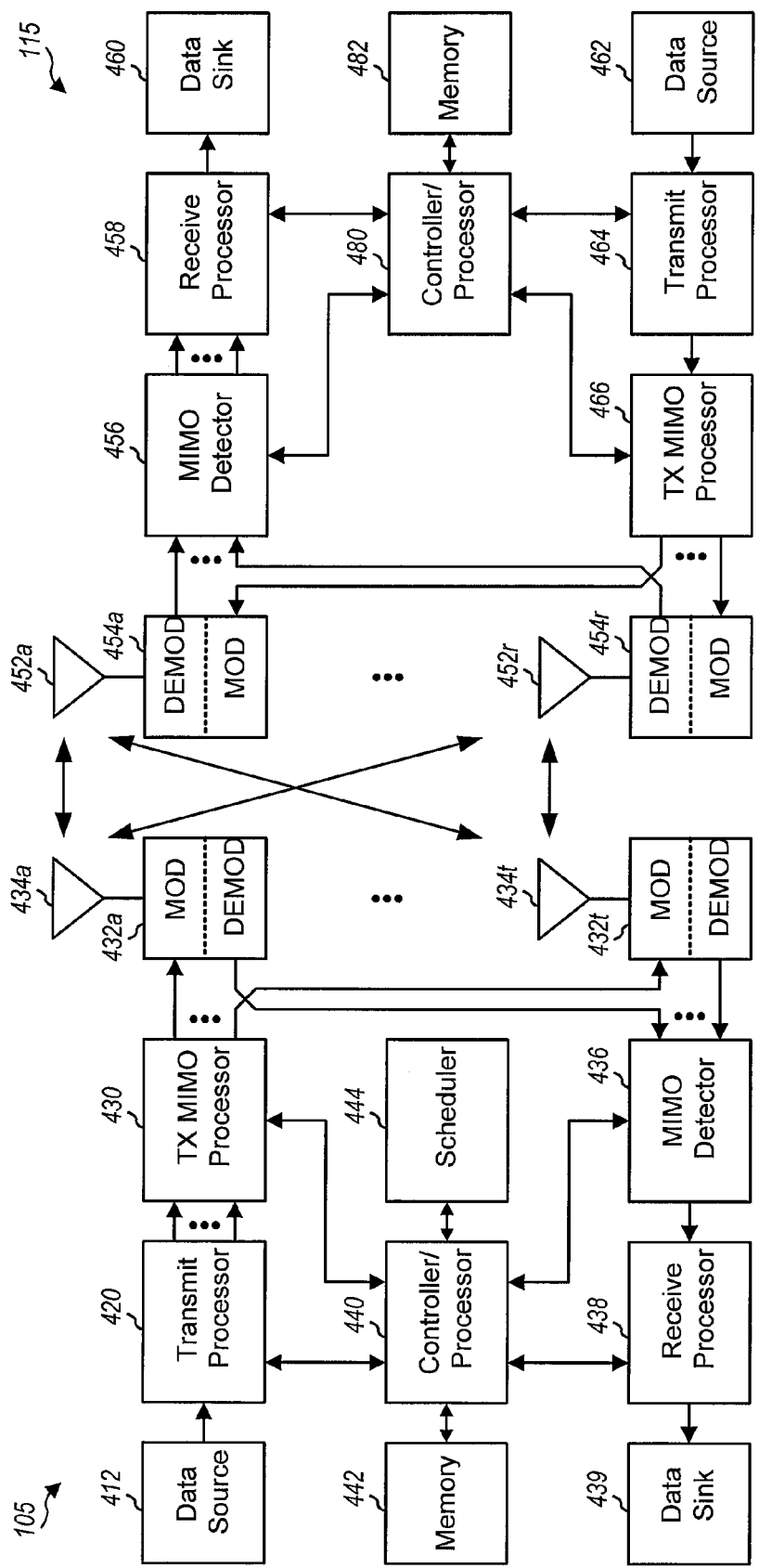
FIG. 4 is a block diagram conceptually illustrating a design of a base station/eNB and a UE configured according to one aspect of the present disclosure.

FIG. 4 shows a block diagram of a design of a base station/eNB 105 and a UE 115, which may be one of the base stations/eNBs and one of the UEs in FIG. 1. The eNB 105 may be equipped with antennas 434*a* through 434*t*, and the UE 115 may be equipped with antennas 452*a* through 452*r*. At the eNB 105, a transmit processor 420 may receive data from a data source 412 and control information from a controller/processor 440. The control information may be for the physical broadcast channel (PBCH), physical control format indicator channel (PCFICH), physical hybrid automatic repeat request indicator channel (PHICH), physical downlink control channel (PDCCH), etc. The data may be for the physical downlink shared channel (PDSCH), etc. The transmit processor 420 may process (e.g., encode and symbol map) the data and control information to obtain data symbols and control symbols, respectively. The transmit processor 420 may also generate reference symbols, e.g., for the primary synchronization signal (PSS), secondary synchronization signal (SSS), and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 115, the antennas 452*a* through 452*r* may receive the downlink signals from the eNB 105 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 115 to a data sink 460, and provide decoded control information to a controller/processor 480.

On the uplink, at the UE 115, a transmit processor 464 may receive and process data (e.g., for the physical uplink shared channel (PUSCH)) from a data source 462 and control information (e.g., for the physical uplink control channel (PUCCH)) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the eNB 105. At the eNB 105, the uplink signals from the UE 115 may be received by the antennas 434, processed by the modulators 432, detected by a MIMO detector 436 if applicable, and further processed by a receive processor 438 to obtain decoded data and control information sent by the UE 115. The processor 438 may provide the decoded data to a data sink 439 and the decoded control information to the controller/processor 440.

The controllers/processors 440 and 480 may direct the operation at the eNB 105 and the UE 115, respectively. The controller/processor 440 and/or other processors and modules at the eNB 105 may perform or direct the execution of various processes for the techniques described herein. The controllers/processor 480 and/or other processors and modules at the UE 115 may also perform or direct the execution of the functional blocks illustrated in FIGS. 5-13 and 16, and/or other processes for the techniques described herein. The memories 442 and 482 may store data and program codes for the eNB 105 and the UE 115, respectively. A scheduler 444 may schedule UEs for data transmission on the downlink and/or uplink.

With the implementation of wireless technologies for communication using LTE/LTE-A with unlicensed spectrum, various adaptations may be desirable in order to accommodate LTE operations over an unlicensed band with efficiency and a little change from the current LTE standards as possible. For example, various downlink procedures may be adapted for LTE operations with unlicensed spectrum in LTE/LTE-A deployments with unlicensed spectrum.

One aspect of downlink LTE operations for consideration in adaptation for LTE/LTE-A applications with unlicensed spectrum is the cyclic prefix (CP) operation. In LTE, two CP durations are supported (normal CP (NCP) and extended CP (ECP)). NCP duration is approximately 5 µs, while ECP duration is approximately 17 µs. NCP makes more efficient use of overhead than ECP configurations. Therefore, it may be desirable to provide for NCP in LTE/LTE-A deployments with unlicensed spectrum. CP for DL and UL may be separately configured, which would, therefore, result in four combinations for DL and UL CP durations between NCP and ECP.

As indicated, NCP may be sufficient for LTE/LTE-A deployments with unlicensed spectrum at least for unicast transmissions. Due to limited transmit power and coverage range, there may also be motivation to consider an even shorter CP for more efficient operations. FIG. 5A is a functional block diagram illustrating example blocks executed to implement one aspect of the present disclosure. At block 500, a base station configured to transmit OFDMA communication signals over unlicensed spectrum generates a communication for transmission. At block 501, the base station adds an unlicensed band cyclic prefix to the communication, wherein a duration of the unlicensed band cyclic prefix is less than or equal to a normal cyclic prefix associated with communications over licensed spectrum. At block 502, the base station transmits the communication to one or more UEs over an unlicensed band. The communication may be a unicast communication addressed specifically to each of the one or more UEs or may be a broadcast communication for the one or more UEs within the coverage area of the base station.

FIG. 5B is a functional block diagram illustrating example blocks executed to implement one aspect of the present disclosure. At block 503, a UE configured to receive OFDMA communication signals from a base station over licensed and unlicensed spectrum receives a communication from a serving base station over an unlicensed band. In response to receiving the communication over the unlicensed band, at block 504, the UE processes the communication using an unlicensed band cyclic prefix, wherein a duration of the unlicensed band cyclic prefix is less than or equal to a normal cyclic prefix associated with communications over a licensed band. In such OFDMA communications received by the UE over an unlicensed band, the UE uses the unlicensed band cyclic prefix which, in selected aspects, may be of a duration less than that of a normal cyclic prefix in licensed band communications. As such, the communications may be received and process more efficiently and potentially with an increase in data throughput.

In LTE, eMBMS transmissions may be performed as single-cell transmissions or as multi-cell transmissions. In the case of multi-cell transmission, the cells and content are synchronized to enable for the terminal to soft-combine the energy from multiple transmissions. The superimposed signal looks like multipath to the terminal. This concept is also known as Single Frequency Network (SFN). The LTE network can configure which cells are parts of an SFN for transmission of an eMBMS service. In multicast, broadcast single frequency network (MBSFN), the transmission happens from a time-synchronized set of eNBs using the same resource block. The CP typically used for MBSFN is an ECP, and this enables the UE to combine transmissions from different eNBs located far away from each other, thus somewhat negating some of the advantages of SFN operation.

Communications using eMBMS may also be implemented in LTE/LTE-A deployments with unlicensed spectrum. For such eMBMS communication over the unlicensed spectrum, NCP may be sufficient because of the limited coverage range of the LTE/LTE-A deployments with unlicensed spectrum. However, as noted above, current MBSFN reference signals are designed based on ECP. Therefore, when performing eMBMS communications over MBSFN channels, NCP are used for the eMBMS communication in addition to a new MBSFN reference signal pattern (e.g., reuse port 5 DM-RS pattern, and the like). FIG. 6A is a functional block diagram illustrating example blocks executed to implement one aspect of the present disclosure. At block 600, a base station configured to transmit OFDMA communication signals over unlicensed spectrum generates a broadcast communication, such as an eMBMS communication. At block 601, the base station adds an unlicensed band cyclic prefix to the broadcast communication, wherein a duration of the unlicensed band cyclic prefix is equal to a normal cyclic prefix associated with communications over licensed spectrum. At block 602, the base station generates a broadcast reference signal, such as an MBSFN reference signal, according to a pattern associated with the unlicensed band cyclic prefix. At block 603, the base station broadcasts the broadcast reference signal and broadcast communication over an unlicensed band.

Figure 6B:
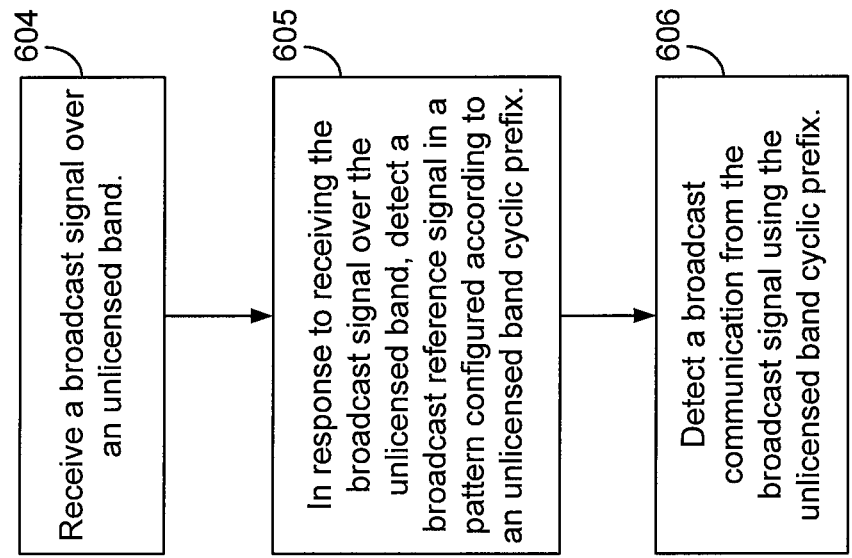
FIGS. 6A and 6B are functional block diagram illustrating example blocks executed to implement one aspect of the present disclosure.
Figure 6A:
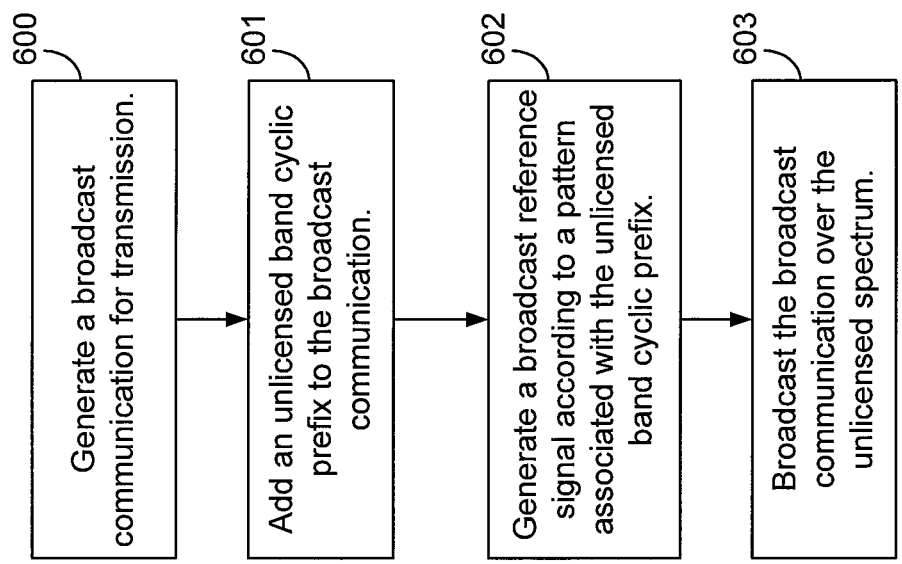

FIG. 6B is a functional block diagram illustrating example blocks executed to implement one aspect of the present disclosure. At block 604, a UE configured to receive OFDMA communication signals from a base station over licensed and unlicensed spectrum receives a broadcast signal over an unlicensed band. At block 605, in response to receiving the broadcast signal over the unlicensed band, the UE detects a broadcast reference signal, such as an MBSFN reference signal, in a pattern configured according to an unlicensed band cyclic prefix, wherein a duration of the unlicensed band cyclic prefix is equal to a normal cyclic prefix associated with communications over a licensed band. At block 606, the UE detects a broadcast communication, such as an eMBMS transmission, from the broadcast signal using the unlicensed band cyclic prefix.

In additional aspects of the present disclosure, LTE/LTE-A with unlicensed spectrum may simplify frame structure by selecting the cyclic prefix type based on the particular subframe. For example, clear channel assessment (CCA) subframes or modified special subframes (S'), in which the CCA is made, will use NCP, while other subframes may use either NCP or ECP depending on the deployment, such as supplemental download (SDL) and carrier aggregation (CA) LTE/LTE-A deployments with unlicensed spectrum. FIG. 7 is a functional block diagram illustrating example blocks executed to implement one aspect of the present disclosure. At block 700, a base station configured to transmit OFDMA communication signals over unlicensed spectrum generates a communication for transmission to one or more UEs. At block 701, the base station detects a subframe in which the communication will be transmitted. At block 702, the base station selects an unlicensed band cyclic prefix based on the detected subframe. At block 703, the base station adds the selected unlicensed band cyclic prefix to the communication. At block 704, the base station transmits the communication over an unlicensed band.

In SDU and CA LTE/LTE-A deployments with unlicensed spectrum in which the unlicensed band deployment is the secondary component carrier (SCC), the unlicensed band may have the same or different cyclic prefix as the anchor CC. Accordingly, there would be no need to enforce the same cyclic prefix. In such aspects where the unlicensed band SCC may use a different cyclic prefix, the unlicensed band base station may convey the cyclic prefix to the UE via direct signaling. Alternatively, the cyclic prefix information of a secondary unlicensed band CC may be discovered by the UE using blind detection. For example, the downlink cyclic prefix may be blindly detected via some physical signals/channels, e.g., PSS/SSS, by the UE.

In certain aspects of the disclosure, unicast transmissions may be configured with a single type of cyclic prefix.

Additional downlink aspects that may be accommodated for LTE/LTE-A deployments with unlicensed spectrum include frame structure. In LTE, both frequency division duplex (FDD) and time division duplex (TDD) structures are supported. In order to allow early differentiation of these two frame structures, PSS/SSS are generally placed differently. For example, FDD structures place PSS/SSS in subframes 0/5 in the last two symbols of slot 0—SSS followed by PSS. TDD structures place PSS/SSS in subframes 0/1/5/6, with SSS placed in the last symbol of subframes 0/5 and PSS in the third symbol of subframes 1/6. However, for LTE/LTE-A deployments with unlicensed spectrum, there are no paired downlink/uplink carriers. LTE/LTE-A with unlicensed spectrum employs two types of structures: downlink-only subframes and mixed downlink/uplink subframes, such as downlink plus at least one uplink subframe. Downlink-only subframe configurations in LTE/LTE-A with unlicensed spectrum may be similar to the support of the LTE downlink-only Band 29 at least in SDL and CA deployment scenarios. Thus, for example, some UEs may only be configured to receive on the unlicensed carrier band, instead of receiving and transmitting on unlicensed carrier band.

For SDL/CA LTE/LTE-A deployments with unlicensed spectrum, the two structures, or the actual configurations, may be indicated to the UE via the anchor CC. UEs may still search for these carriers, before they are added to serving cells, without any assistance from the anchor CC. However, the same frequency could belong to a licensed band in one region or country and an unlicensed band in a different region or country. The UE may not be aware of such difference and may perform cell search in a transparent manner. Thus, both structures for downlink-only and mixed downlink/uplink may be supported. The distinction between the two structures may, in some aspects, be indicated via different PSS/SSS placements, or, in other aspects, conveyed in system messages, such as master information blocks (MIBs) or system information blocks (SIBs).

FIG. 8 is a functional block diagram illustrating example blocks executed to implement one aspect of the present disclosure. At block 800, a UE obtains indication of a frame structure for communication with a serving base station, wherein the UE is configured to receive orthogonal frequency divisional multiple access (OFDMA) communication signals from the serving base station over licensed and unlicensed spectra. To obtain the frame structure indication, the UE may receive indication of the structure through accessing the anchor CC. The signaling may be contained in various system messages, such as MIBs or SIBs. Additional aspects provide that the UE may perform cell search for the frame structure. By performing such cell search in a transparent manner, the UE may obtain the structure regardless of whether the frequency of the carrier belongs in a licensed or unlicensed band. Additionally, the UE may obtain indication of the frame structure through the traditional means of the different PSS/SSS placements. At block 801, the UE configures its communications with the base station according to the indicated frame structure. The frame structures indicated may support at least the downlink-only and mixed downlink/uplink structures.

It should be noted that in various alternative deployments of LTE/LTE-A with unlicensed spectrum, an uplink-only subframe configuration may be defined. In such aspects, three configurations are available: downlink-only, uplink-only, and mixed downlink/uplink frame structure.

Additional downlink aspects that may be accommodated for LTE/LTE-A deployments with unlicensed spectrum include synchronization signals. In LTE, PSS/SSS may be used for UE to acquire time and frequency synchronization, and to facilitate cell search. PSS/SSS is typically only transmitted in the center 6 RBs. In LTE/LTE-A with unlicensed spectrum, at least for standalone (SA) deployments, similar signals should be provided.

In consideration of the time domain, LTE/LTE-A deployments with unlicensed spectrum should consider synchronization signal transmission less frequent than the 5 ms period defined in LTE. The reduced frequency of synchronization signals represents a consideration between overhead, acquisition delay tradeoff, and dynamic resource availability. LTE/LTE-A deployments with unlicensed spectrum that use WIFI nodes operate under a 5% flexible transmission budget. The 5% flexible transmission budget prevents a WIFI node from autonomously transmitting more than 5% within any 50 ms period. Accordingly, one aspect of the present disclosure suggests a fixed periodicity of 80 ms for PSS/SSS transmission in a guaranteed manner, similar to dormant cell operation. In such aspects, the buffer size for PSS/SSS samples would be increased by a certain amount, such as the amount of the period, e.g., 80 ms.

Figure 9:
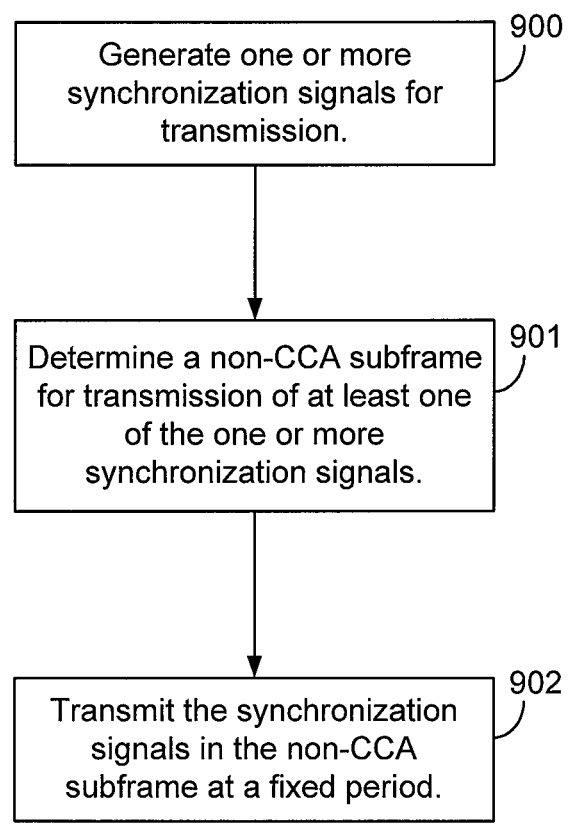
FIG. 9 is a functional block diagram illustrating example blocks executed to implement one aspect of the present disclosure.

The LTE/LTE-A node with unlicensed spectrum may provide for guaranteed transmission (such as CCA-exempt) of synchronization signals in non-CCA subframes according to the fixed period, e.g., 80 ms, and still meet the 5% flexible transmission budget. FIG. 9 is a functional block diagram illustrating example blocks executed to implement one aspect of the present disclosure. At block 900, an LTE/LTE-A base station with unlicensed spectrum generates one or more synchronization signals, such as PSS/SSS, for transmission. At block 901, the LTE/LTE-A base station with unlicensed spectrum determines a non-CCA subframe for transmission of the synchronization signals. Using the non-CCA subframe, the LTE/LTE-A base station with unlicensed spectrum may establish a guaranteed transmission of the synchronization signals. At block 902, the LTE/LTE-A base station with unlicensed spectrum transmits the synchronization signals in the non-CCA subframe subject to the fixed period.

It should be noted that in additional aspects of the present disclosure, the fixed period for guaranteed transmission may be set to a time different than 80 ms. For example, since the 5% flexible transmission budget requirements are measured over a 50 ms period, the fixed period for guaranteed transmissions may also be set to 50 ms. While 80 ms offers the benefit of being more evenly divisible or comparable to many different system parameters, a shorter period, such as 50 ms would provide more opportunities for guaranteed operations. Other times may be considered as well, 60 ms, 70 ms, and the like.

For connected and/or idle UEs to minimize measurement gaps, the UEs may either assume synchronization between neighboring cells/neighboring frequencies, or the LTE/LTE-A base station with unlicensed spectrum may signal the UEs where to look for the guaranteed PSS/SSS transmissions. For connected UEs, additional information can be indicated for improved time/frequency tracking (e.g., more PSS/SSS subframes).

The guaranteed transmission of synchronization signals may be located at a fixed subframe index (e.g., subframe 9), subject to certain periodicity, or may be staggered over different cells/different carriers. The staggering may allow for multiple carriers to have non-overlapping synchronization signals transmitted through the LTE/LTE-A deployment with unlicensed spectrum.

The fixed periodicity of the guaranteed transmissions of PSS/SSS for SDL/CA may be different than the fixed period for SA LTE/LTE-A deployments with unlicensed spectrum. This difference is supportable given that coarse timing may be obtained from an anchor CC for the SDL/CA deployments, assuming that the anchor CC and unlicensed band CC are in sync or the timing offset is fixed (which can be assumed by or indicated to the UE). For example, the unlicensed band CCs may be time-aligned among themselves, and the licensed band CCs may also time aligned among themselves. However, there may be some fixed timing offset between the licensed and unlicensed band CCs.

In addition to the guaranteed transmission of synchronization signals, LTE/LTE-A with unlicensed spectrum may also provide additional opportunistic transmission of synchronization signals as well. The additional PSS/SSS that are opportunistically transmitted in CCA-based subframes may provide additional help for cell search and synchronization. In such CCA-based subframes, if the base station detects a clear CCA, then it may transmit synchronization signals at some point before the expiration of the clear period. After detecting a clear CCA, the transmission stream are guaranteed to be available for a predetermined duration, such as 5-10 ms. In addition to searching for synchronization signals at the guaranteed locations, UEs may also perform cell search for synchronization signals more often. For example, idle UEs may also try to look for PSS/SSS every 5 ms. However, inter-frequency status should be based on the guaranteed transmission subframes.

The number of synchronization symbols may also be a consideration for various aspects of the present disclosure. In one aspect, both PSS and SSS may have separate symbols. The separation of PSS/SSS symbols can be fixed (similar to the current FDD placement), or placed differently for different frame structures (e.g., DL-only structure vs. mixed DL/UL subframe structure). In additional aspects of the present disclosure, 1-symbol synchronization signals may be transmitted as well. For example, a 1-symbol synchronization signal may include a 1-symbol combination of both PSS/SSS, or a 1-symbol transmission with only SSS (no PSS transmission, since SSS carries all the necessary information for cell ID).

In various aspects of the present disclosure, the LTE/LTE-A base station with unlicensed spectrum may multiplex the synchronization signals with other reference signals, such as CRS, in a resource block of the same symbol. At least for SSS, where the resource elements for other reference signals can be derived based on the PSS. For example, if multiplexing with CRS, PSS may provide the frequency shift for the CRS.

Figures 10A, 10B:
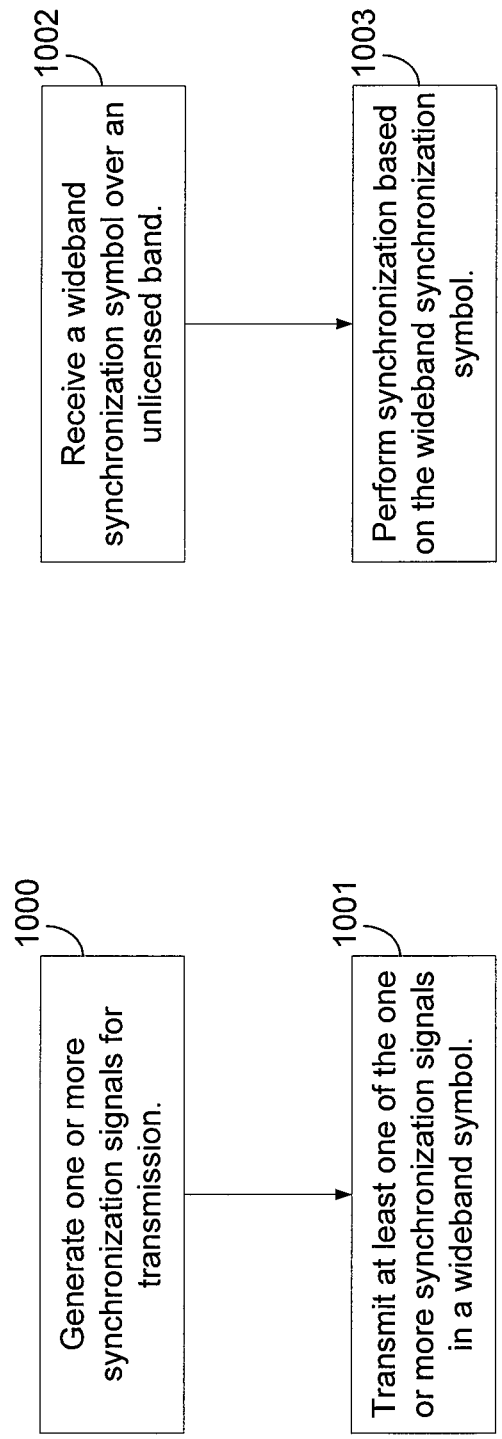
FIGS. 10A and 10B are functional block diagram illustrating example blocks executed to implement one aspect of the present disclosure.

Regulations provide for PSS/SSS symbols transmitted using WIFI over LTE/LTE-A systems with unlicensed spectrum to be wideband symbols. Thus, the set of system bandwidths for LTE/LTE-A with unlicensed spectrum may be different from LTE (>1.4 MHz). Due to large bandwidths, raster size may be increased as well. FIGS. 10A and 10B are functional block diagrams illustrating example blocks executed to implement aspects of the present disclosure. At block 1000, an LTE/LTE-A base station with unlicensed spectrum generates one or more synchronization signals for transmission. At block 1001, the LTE/LTE-A base station with unlicensed spectrum transmits the one or more synchronization signals in a wideband symbol. The UE, at block 1002, receives the wideband synchronization symbol over the unlicensed band and, at block 1003, performs synchronization based on the wideband synchronization symbol. In the various aspects of the disclosure illustrated in FIGS. 10A and 10B, the synchronization signals themselves may be generated as wideband synchronization signals, e.g., wideband PSS/SSS signals. In such aspects, the wideband PSS/SSS may simply include repetition of PSS/SSS sequences of current 1.08 MHz to the larger bandwidth. Alternatively, a new synchronization sequence, that includes the narrowband synchronization signals plus additional information, such as CUPS/CUBS. The new sequence may help to provide early identification of LTE/LTE-A systems without unlicensed spectrum vs. with unlicensed spectrum. Because the guaranteed transmissions of PSS/SSS signals are less frequent, better sequence design may significantly improve performance. One tradeoff to a larger bandwidth for PSS/SSS in an increase of the UE's power consumption and buffer size (e.g., 80 ms×20 MHz, vs. 80 ms×1.4 MHz).

In an alternative aspect of the present disclosure, the wideband synchronization symbol may be a combination of the narrowband PSS/SSS signals (e.g., 6 RBs as in LTE) plus other signals. The other signals may be CUPS/CUBS. For example, in certain aspects, the wideband synchronization symbol may include the narrowband PSS/SSS plus the CUPS/CUBS regardless of the base station scheduling. Additional aspects of the present disclosure may also determine what additional information is added to the narrowband PSS/SSS to make up the wideband symbols. For example, when there is no traffic at the base station, then the wideband synchronization symbols include the narrowband PSS/SSS and CUBS. However, if there is traffic at the base station for transmission, then the wideband synchronization symbol includes the narrowband PSS/SSS plus data signals. Thus, in such aspects the data throughput may be improved.

For SDL/CA LTE/LTE-A deployments with unlicensed spectrum, it may be possible to omit synchronization signal transmission entirely on secondary CCs. FIG. 11 is a functional block diagram illustrating example blocks executed to implement one aspect of the present disclosure. At block 1100, the SDL/CA LTE/LTE-A base station with unlicensed spectrum detects synchronization between a secondary CC and a primary CC associated with the secondary CC. This would not be applicable for non-co-located CCs (e.g., multiflow) or if measurement relies on PSS/SSS knowledge. At block 1101, the SDL/CA LTE/LTE-A base station with unlicensed spectrum omits transmission of synchronization signals on the secondary CC in response to detecting the synchronization.

Additional downlink aspects that may be accommodated for LTE/LTE-A deployments with unlicensed spectrum include the broadcast channel that carries system information used for cell search by the UE. In LTE, the broadcast channel, physical broadcast channel (PBCH), provides crucial system information and is transmitted every 10 ms with a 40 ms transmission time interval (TTI). Thus, the information contained within the PBCH changes every 40 ms. Typically, the PBCH includes an 8-bit SFN, 4-bit system bandwidth information, and 3-bit PHICH information. In LTE/LTE-A with unlicensed spectrum, it is contemplated that either EPBCH or SIB-lite (SIB-0) will be transmitted.

Transmission of EPBCH in LTE/LTE-A deployments with unlicensed spectrum is similar to the transmission of synchronization signals, as disclosed above. In the time domain, EPBCH will be similar to PSS/SSS and may have the same or different periodicity. Because LTE/LTE-A deployments with unlicensed spectrum may have a higher system bandwidth available, the EPBCH may occupy less than 4 symbols if the system bandwidth is large (e.g., 20 MHz or higher). At 20 MHz, there are approximately 800 tones/symbol for 20 MHz [1200−4 (CRS tones/RB)×100 (RBs)], vs. 240 tones for EPBCH in LTE without unlicensed spectrum. Similarly, because transmission of EPBCH is also subject to the 5% flexible transmission budget, the EPBCH TTI may be more than two times longer than the existing 40 ms. For example, with a fixed period of 80 ms, the EPBCH TTI may be 320 ms, such that the EPBCH contents does not change over 320 ms. The 5% flexible transmission budget or 5% duty cycle over 50 ms is a combined measurement. Therefore, the combination of PSS/SSS, EPBCH, and measurement RS transmission should not exceed the 5% duty cycle in 50 ms.

FIG. 12 is a functional block diagram illustrating example blocks executed to implement one aspect of the present disclosure. At block 1200, an LTE/LTE-A base station with unlicensed spectrum generates one or more system broadcast signals for transmission. The system broadcast signals may include EPBCH, PBCH, and the like, which carry important system information used by the UE for cell search, synchronization, and the like. At block 1201, the base station determines a non-CCA subframe for transmission of at least one of the system broadcast signals. Similar to guaranteed transmission of the synchronization signals, as disclosed above, guaranteed transmission of the system broadcast signals may be configured according to similar procedures. The non-CCA subframes have no transmission restrictions associated with them. At block 1202, the LTE/LTE-A base station with unlicensed spectrum transmits the system broadcast signals in the non-CCA subframe at a fixed period that allows the 5% duty cycle over 50 ms restriction to be met.

Figures 13A, 13B:
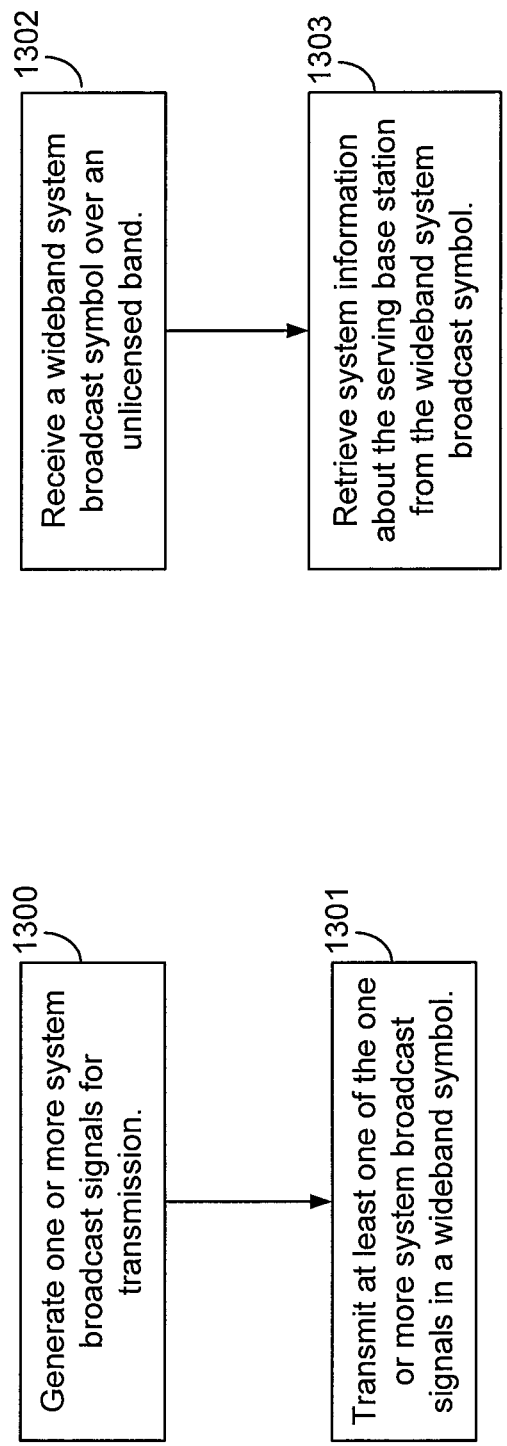
FIGS. 13A and 13B are functional block diagram illustrating example blocks executed to implement one aspect of the present disclosure.

As with the synchronization signals, the symbol location and/or subframe location for EPBCH can be fixed or a function of cell ID and/or carrier index. The bandwidth of the system broadcast signals may or may not be similar to that of the synchronization signals. Regulations provide for transmission of wideband EPBCH symbol which may either be implemented using a wideband EPBCH or the combination of a narrowband EPBCH and additional symbols, such as CUPS/CUBS, data transmissions, or the like. FIGS. 13A and 13B are functional block diagrams illustrating example blocks executed to implement various aspects of the present disclosure. At block 1300, an LTE/LTE-A with unlicensed spectrum base station generates one or more system broadcast signals, such as an EPBCH, for transmission. At block 1301, the LTE/LTE-A base station with unlicensed spectrum transmits the system broadcast signals in a wideband symbol. At block 1302, a UE, configured to receive communication from the LTE/LTE-A base station with unlicensed spectrum receives a wideband system broadcast symbol over an unlicensed band and, at block 1303, is able to retrieve system information about the LTE/LTE-A base station with unlicensed spectrum from the wideband system broadcast signal.

Figure 14:
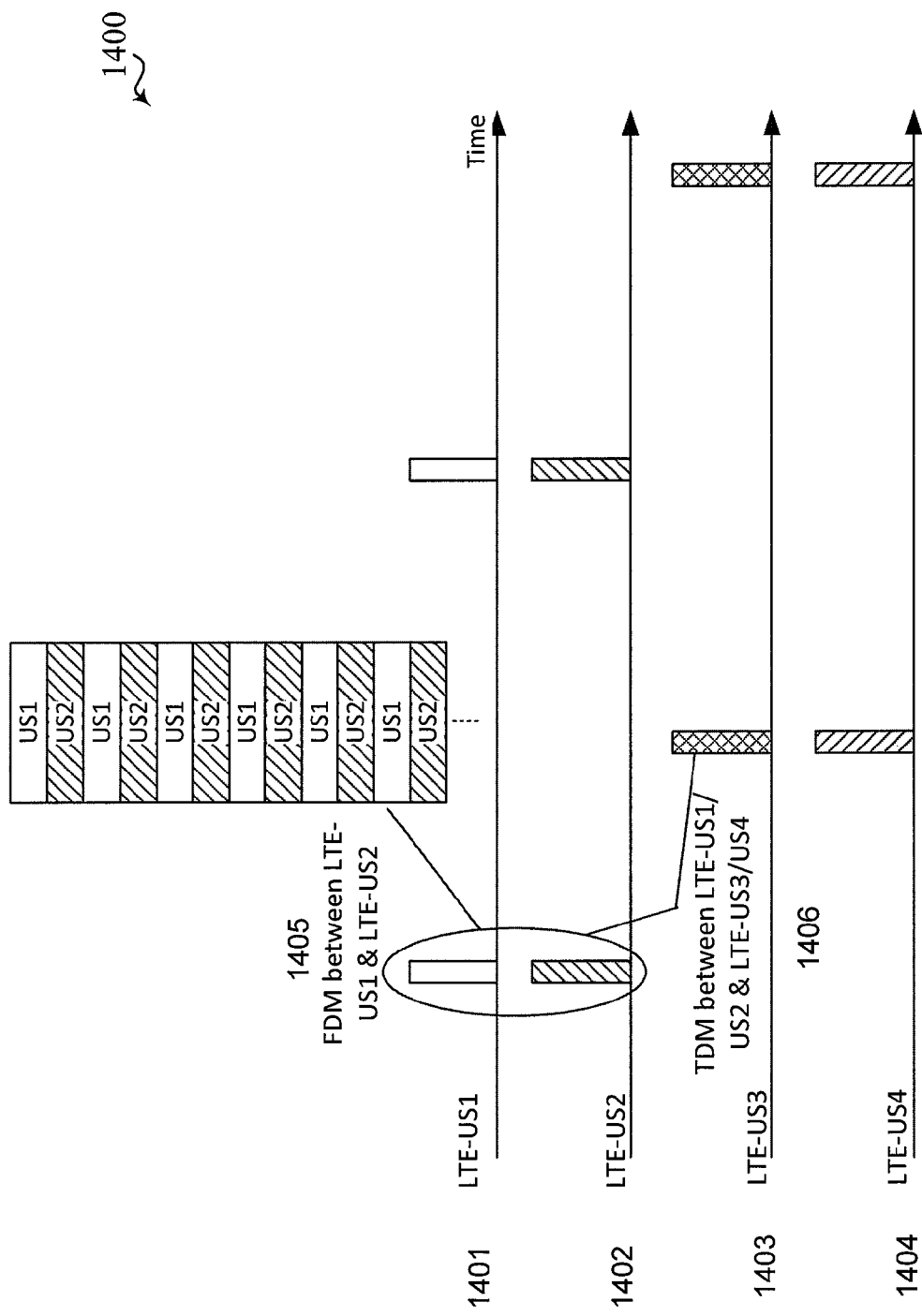
FIG. 14 is a block diagram illustrating a transmission timeline in an LTE/LTE-A deployment with unlicensed spectrum configured according to one aspect of the present disclosure.

Moreover, the frequency location/tones for EPBCH may be at a fixed location or a function of cell ID and/or carrier index. For example, within a 20 MHz bandwidth, a reuse factor of 3 can be achieved if each cell occupies every 3 tones. Generally, some EPBCH reuse over different cells/frequencies can be realized via frequency, time (different symbols within a subframe and/or different subframes), or a combination thereof. FIG. 14 is a block diagram illustrating a transmission timeline 1400 in an LTE/LTE-A deployment with unlicensed spectrum configured according to one aspect of the present disclosure. Four transmissions from LTE unlicensed spectrum (LTE-US) 1401-1404 represent guaranteed transmissions of EPBCH at fixed intervals. LTE-US1 1401 and LTE-US2 1402 transmit EPBCH at the same time and interval. In order to increase frequency reuse for EPBCH signals, the EPBCH transmission of LTE-US1 1401 and LTE-US2 1402 are frequency division multiplexed (FDM) into FDM transmission 1405. The EPBCH transmissions from LTE-US3 1403 and LTE-US4 1404 are also transmitted at the same time and interval, and may also be FDM into another FDM transmission. Further increasing the reuse of the EPBCH transmissions, the FDM transmission 1405 and the FDM transmission of LTE-US3 1403 and LTE-US4 1404 may then each be time division multiplexed 1406.

An additional aspect of EPBCH that may be modified to accommodate LTE/LTE-A deployments with unlicensed spectrum are the information fields added to EPBCH in the unlicensed band. For example, information fields of the EPBCH in LTE/LTE-A deployments with unlicensed spectrum may include network identifiers, such as the 24-bit public land mobile number (PLMN), cell identifiers, such as the 28-bit cell global identifier (CGI) and other such information. The information fields may also include some of the physical random access channel (PRACH) parameters to enable fast random access procedure with the LTE/LTE-A base station with unlicensed spectrum.

Additionally, single frequency network (SFN) bits may be used in EPBCH for eMBMS services, paging, and the like. Moreover, depending on how PSS/SSS/PBCH are transmitted, the SFN bits in EPBCH may not be the same 8-bit SFN in LTE For example, in LTE/LTE-A with unlicensed spectrum with an EPBCH TTI of 320 ms, an SFN of only 5-bits may be sufficient.

The system bandwidths of the LTE/LTE-A deployments with unlicensed spectrum may also be fixed (e.g., 20 MHz) or variable with two or more bandwidths (e.g., 20 MHz/40 MHz/80 MHz/160 MHz). When the bandwidths are fixed, there would be no reason to include a bandwidth indicator in the information fields of the EPBCH. However, when variable system bandwidths are available, the EPBCH may also include a system bandwidth identifier that signals to the UE what the system bandwidth is for the base station. Each component carrier may have the same bandwidth and its own EPBCH which includes a separate bandwidth indicator. Additionally or separately, EPBCH in a first component carrier may indicate a set of component carriers of a same bandwidth of the first component carrier available to the UE. This would help UE detect the set of component carriers associated with a LTE/LTE-A eNB with unlicensed spectrum.

Information fields in EPBCH in LTE/LTE-A with unlicensed spectrum may also contain control channel (EPDCCH) related information, size and location, instead of fixed location based on a physical cell identifier (PCI), and also frame structure information related to the LTE/LTE-A base station transmissions using the unlicensed spectrum.

The LTE/LTE-A with unlicensed spectrum EPBCH would not necessarily include PHICH related information. Nor, would it need to convey the number of RS ports (e.g., CRS, CSI-RS, etc.) via EPBCH. It should be noted that there is, generally, no strong motivation to support system bandwidths of less than 20 MHz in LTE/LTE-A deployments with unlicensed spectrum, especially with regard to smaller bandwidths, such as 1.4 MHz, 3 MHz and 15 MHz. Additionally, there has been no strong motivation to support distinct downlink and uplink bandwidths in LTE/LTE-A deployments with unlicensed spectrum either.

Additional downlink procedures that may be accommodated for LTE/LTE-A deployments with unlicensed spectrum include various measurement reference signals. Such measurement reference signals may be similar to cell-specific reference signal (CRS) or channel state feedback reference signal (CSI-RS) in LTE. For example, the reference signal for EPBCH decoding may be used for measurements. Channel usage pilot signals (CUPS), which may also be referred to as channel usage beacon signals (CUBS), may also be used for measurements. CUPS/CUBS in subframe 9 may additionally be used for measurements.

Figure 15:
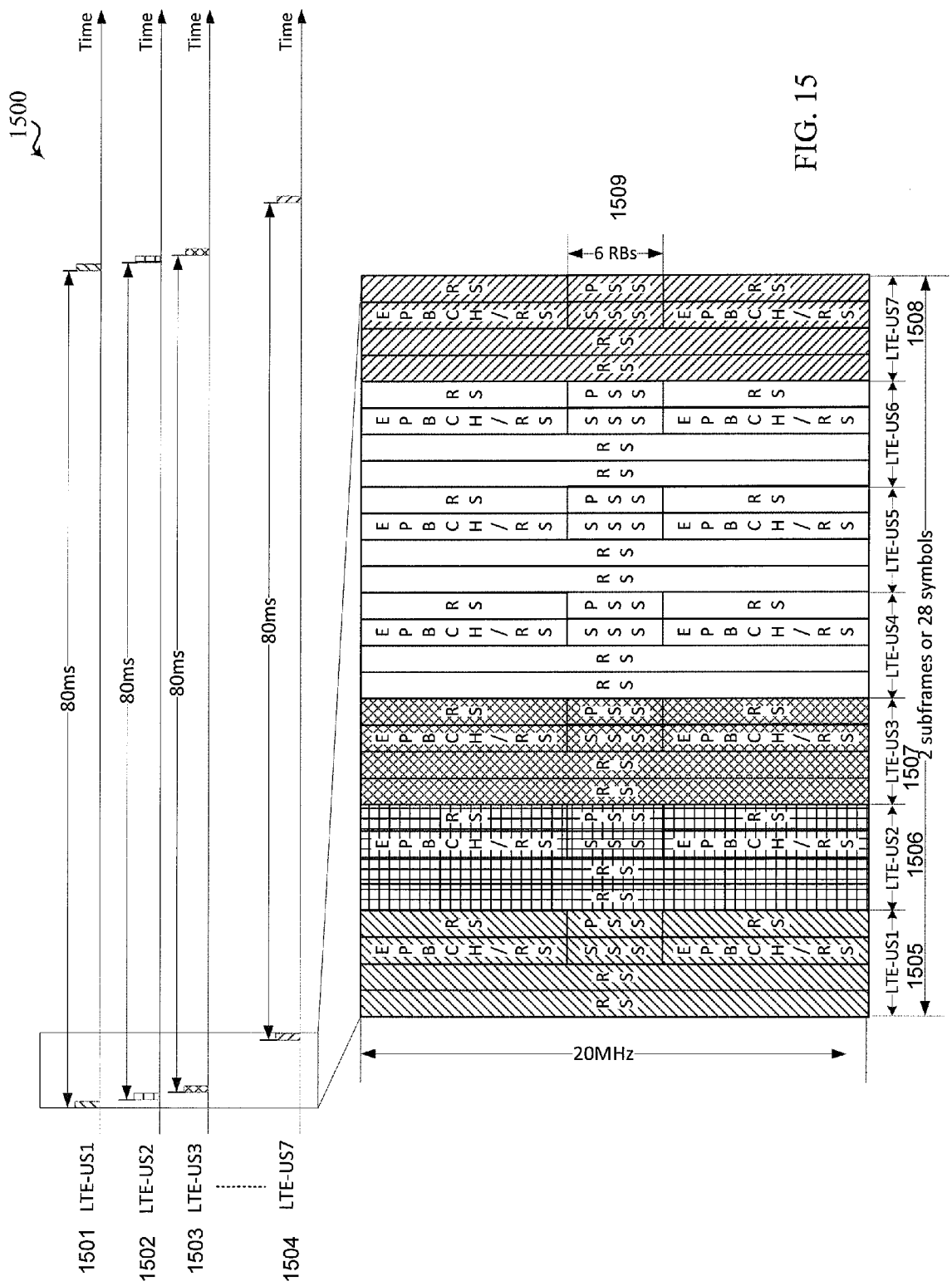
FIG. 15 is a block diagram illustrating a transmission timeline in an LTE/LTE-A deployment with unlicensed spectrum configured according to one aspect of the present disclosure.

Similar to PSS/SSS/EPBCH, some reuse should be provided for measurement reference signals in order to facilitate co-existence of different deployments (e.g., from different operators). The reuse can be realized via TDM within a subframe (different symbols in a subframe, or different slots in a subframe), TDM across subframes (different subframes for different deployments), FDM within a symbol, or a combination thereof. FIG. 15 is a block diagram illustrating a transmission timeline 1500 in an LTE/LTE-A deployment with unlicensed spectrum configured according to one aspect of the present disclosure. The exemplary arrangement of PSS/SSS/EPBCH in FIG. 15 illustrates the guaranteed signal transmissions 1505-1508 of LTE-US1 1501-LTE-US7 1504 at 80 ms periodicity, with a reuse factor 1/7 in 2 subframes (28 symbols), where each node uses 28/7=4 symbols. A 2-port reference signal (which may be a CRS, RS for EPBCH, CUPS/CUBS, or the like, is present in all symbols. PSS/SSS is present in the first 2 symbols in center 6 RBs 1509, and EPBCH is present in the first symbol in remaining bandwidth (assuming 20 MHz, resulting in 94 RBs×8 tones/RB=752 tones for EPBCH. Alternatively, PSS/SSS may be repeated in the first 2 symbols. Yet another alternative is to repeat only SSS in one of the remaining 2 symbols. The remaining resource elements may be for other purposes (e.g., eMBMS, paging, or the like). Group power control may be carried in the region (not shown). Other broadcast/groupcast signaling may be carried in the region (e.g., paging). The placement of PSS/SSS in a node may be provided in some later symbols, such that the first several symbols may be used as preamble to stabilize automatic gain control (AGC). Other system information blocks (SIBs) can be transmitted in non-guaranteed CCA subframes.

Figures 16A, 16B:
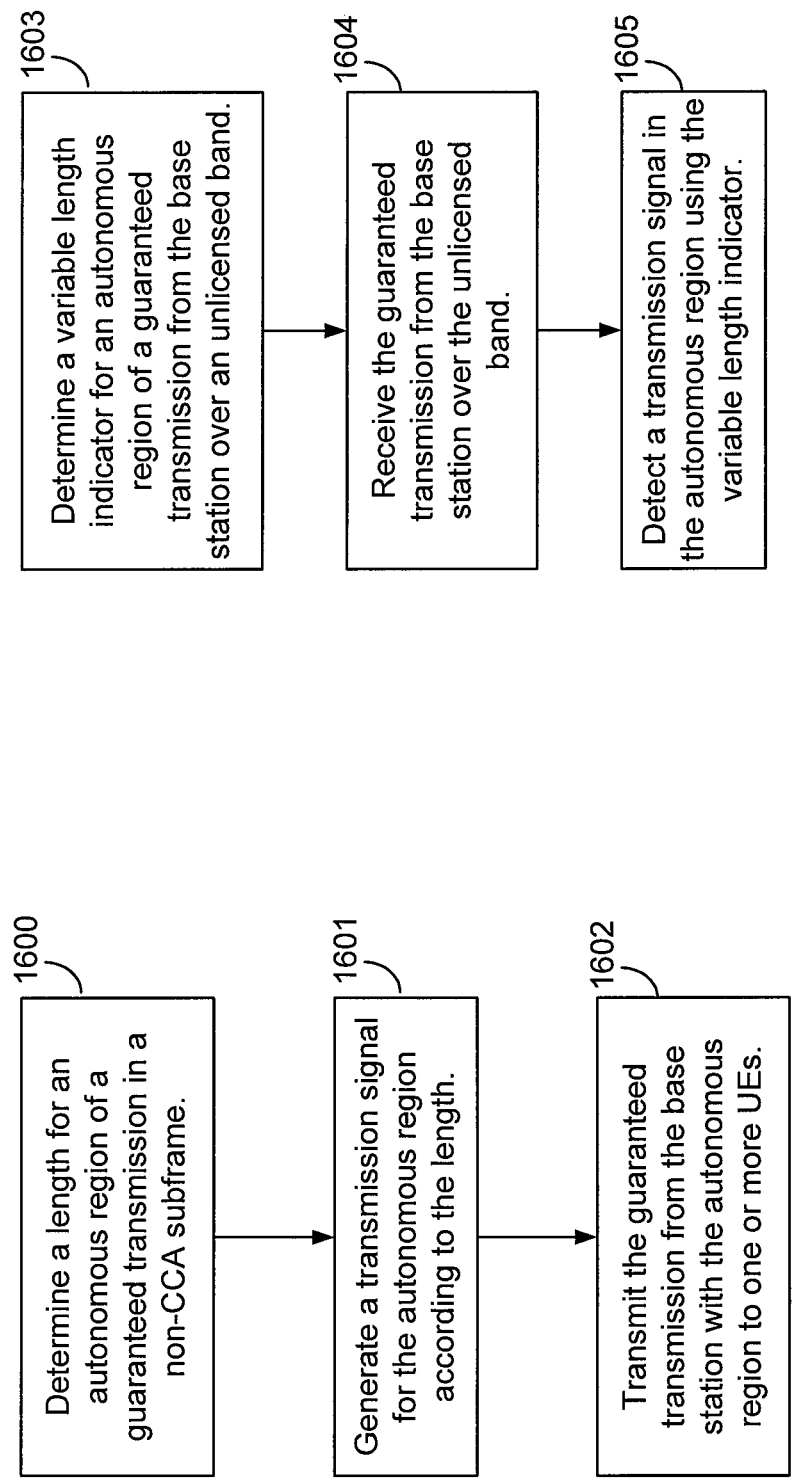
FIGS. 16A and 16B are functional block diagrams illustrating example blocks executed to implement one aspect of the present disclosure.

In the previous examples described with respect to the various aspects of the present disclosure, the length of the autonomous transmission duration for a node is assumed to be fixed, e.g., 4 symbols every 80 ms. However, such fixed length may be restrictive. Various aspects of the present disclosure may provide for a variable length autonomous region for the guaranteed or autonomous transmissions in LTE/LTE-A deployments with unlicensed spectrum. FIGS. 16A and 16B are functional block diagrams illustrating example blocks executed to implement one aspect of the present disclosure. At block 1600, a length is determined at an LTE/LTE-A base station with unlicensed spectrum for an autonomous region of a guaranteed transmission in a non-CCA subframe. An LTE/LTE-A base station with unlicensed spectrum may select a length from a plurality of lengths that provide adequate bandwidth for the desired transmission payload. For example, the LTE/LTE-A base station with unlicensed spectrum may select from four possible values: 4 symbols, 7 symbols (one slot), 14 symbols (1 subframe), and 28 symbols (2 subframes). At block 1601, the base station generates a transmission signal for the autonomous region according to the length. At block 1602, the base station transmits the guaranteed transmission with the autonomous region to one or more UEs over an unlicensed band.

At block 1603, the UE determines a variable length indicator for an autonomous region of a guaranteed transmission from the base station over an unlicensed band. UEs can blindly detect the length of the region or be indicated the length of the region. As an example, the length of the region can be indicated via a 2-bit indicator in EPBCH. At block 1604, the UE receives the guaranteed transmission from the base station over the unlicensed band. At block 1605, the UE detects a transmission signal in the autonomous region using the variable length indicator.

Figure 17:
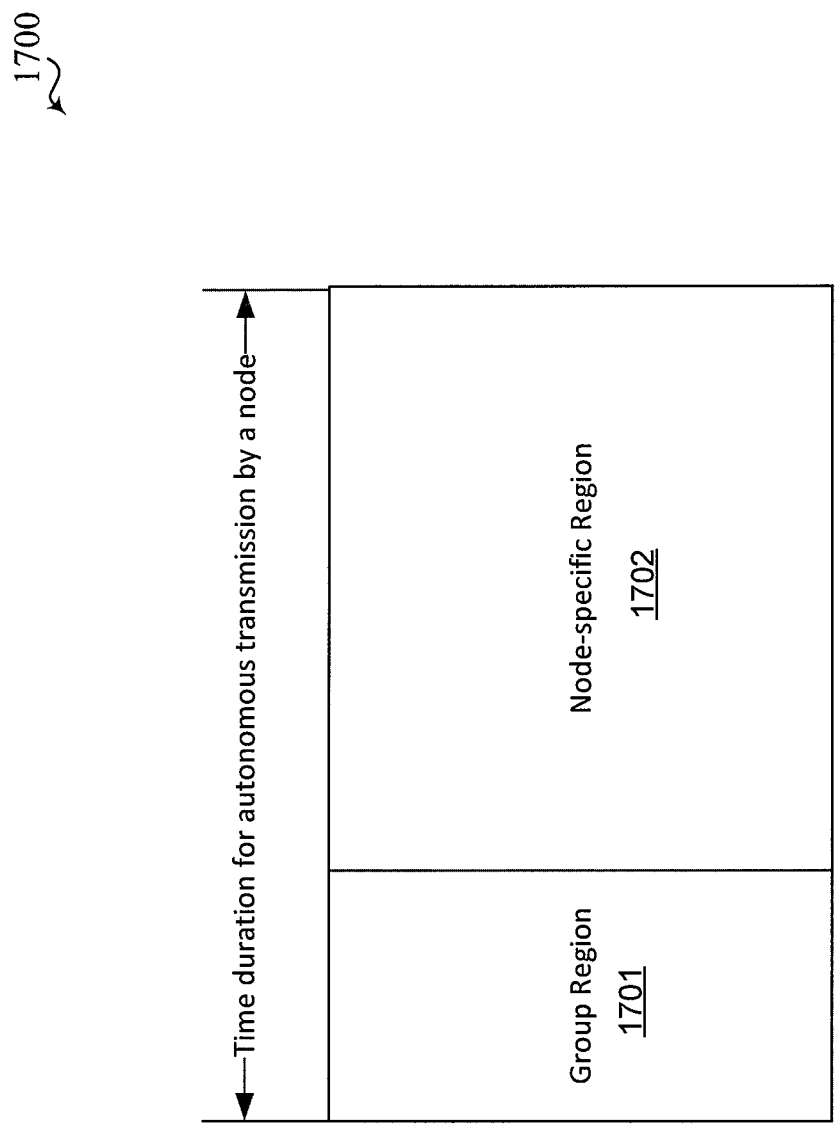
FIG. 17 is a block diagram illustrating a guaranteed transmission configured according to one aspect of the present disclosure.

In the previous examples described with respect to the various aspects of the present disclosure, the autonomous region for guaranteed transmission is specific to a node. However, various aspects of the present disclosure provide for construction of two sub-regions. FIG. 17 is a block diagram illustrating a guaranteed transmission 1700 configured according to one aspect of the present disclosure. Group region 1701 provide SFN operation for two or more nodes. This region may provide information, such as group and cluster discovery signals for two or more nodes. The length of the region may be fixed, but in various aspects of the disclosure may be variable or selectable. Individual region 1702 provides node-specific operation. The length of individual region 1702 may either be fixed or variable. For variable lengths, group region 1701 may provide a signal to indicate the length of individual region 1702.

FIG. 18A is a functional block diagram illustrating example blocks executed to implement one aspect of the present disclosure. Similar to the aspects described with respect to FIGS. 9, 10A, 10B, 12, and the like, at block 1800, a base station generates either one or more synchronization signals or a system broadcast signal for transmission into a coverage area served by the base station. At block 1801, the base station determines a non-CCA subframe for the transmissions. At block 1802, the base station transmits either the synchronization signals or the system broadcast signals in the non-CCA subframe.

FIG. 18B is a functional block diagram illustrating example blocks executed to implement one aspect of the present disclosure. The blocks illustrated in FIG. 18B are directed to a UE that may be served by the base station as described in FIG. 18A. Similar to the aspects described with respect to FIGS. 9, 10A, 10B, and 12, and the like, at block 1803, the UE receives the signals transmitted by the base station, e.g., either the synchronization signals or the system broadcast signal in a non-CCA subframe. At block 1804, the UE communicates with the base station based on the received signals, whether they are the received synchronization signals or the system broadcast signal. The UE uses the received signal to establish communication with the base station.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5-13, 16, and 18 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    generating, at a base station configured to transmit orthogonal frequency divisional multiple access (OFDMA) communication signals over at least an unlicensed spectrum, at least one of: one or more synchronization signals, or a system broadcast signal for transmission, wherein a subframe configuration is provided in the unlicensed spectrum including one or more clear channel assessment (CCA) subframes and one or more non-clear channel assessment (non-CCA) subframes;
    determining, by the base station, non-CCA subframe of the one or more non-CCA subframes in the unlicensed spectrum for transmission of the at least one of: the one or more synchronization signals, or the system broadcast signal; and
    transmitting, by the base station, the at least one of: the one or more synchronization signals, or the system broadcast signal in the non-CCA subframe.

2. The method of claim 1, wherein the transmission in the non-CCA subframe is associated with a duration and a periodicity, and a ratio between the duration and the periodicity is no more than 5%.

3. The method of claim 1, further including:
    detecting, by the base station, a clear CCA in a CCA subframe of the one or more CCA subframes in the unlicensed spectrum; and
    transmitting, by the base station, at least one other of: the one or more synchronization signals, or one other system broadcast signal in the CCA subframe in response to detecting the clear CCA.

4. The method of claim 1, wherein the non-CCA subframe in which the at least one of: the one or more synchronization signals, or one or more system broadcast signals is transmitted is staggered over different carriers.

5. The method of claim 1, wherein the system broadcast signal comprises at least one of:
an indication of a frame structure for at least one unlicensed carrier of the base station,
a network identifier,
a bandwidth identifier identifying one of a plurality of available bandwidths associated with the base station,
an indication of a number of carriers in the unlicensed spectrum,
a number of reference signal ports,
one or more parameters associated with a random access procedure,
a system frame number, or,
information related to control channels, wherein the information comprises at least one of a size or a location of the control channels.

6. The method of claim 5, wherein the frame structure is at least one of: a downlink-only frame structure, a mixed downlink/uplink frame structure, or an uplink-only frame structure.

7. The method of claim 1, wherein the base station includes at least one licensed carrier, and is in communication with at least one user equipment configured with one of: a supplemental downlink (SDL), or carrier aggregation (CA) operation using a carrier in the unlicensed spectrum.

8. The method of claim 1, where the at least one of: the one or more synchronization signals, or the system broadcast signal, is a wideband signal spanning more than 1.4 MHz.

9. The method of claim 1, wherein the transmission of the non-CCA subframe is associated with an offset, and the offset is a function of a network identifier.

10. The method of claim 1, further including, in the non-CCA subframe, at least one of:
cell-specific reference signals (CRS);
channel-state information reference signals (CSI-RS);
reference signals for enhanced physical broadcast channel (EPBCH); or
channel user pilot signals (CUPS)/channel user beacon signals (CUBS).

11. The method of claim 1, wherein a duration of an unlicensed band cyclic prefix of the OFDMA communication signals is less than or equal to a normal cyclic prefix associated with communications over licensed spectrum.

12. A method of wireless communication, comprising:
receiving, at a user equipment configured to receive orthogonal frequency divisional multiple access (OFDMA) communication signals over at least an unlicensed spectrum, at least one of: one or more synchronization signals, or a system broadcast signal in a non-clear channel assessment (non-CCA) subframe of one or more non-CCA subframes in the unlicensed spectrum from a base station, wherein a subframe configuration is provided in the unlicensed spectrum including one or more clear channel assessment (CCA) subframes and the one or more non-CCA subframes; and
communicating, by the user equipment, with the base station based on the received at least one of: one or more synchronization signals, or a system broadcast signal.

13. The method of claim 12, wherein the receiving in the non-CCA subframe is associated with a duration and a periodicity, and a ratio between the duration and the periodicity is no more than 5%.

14. The method of claim 12, further including:
detecting, by the user equipment, a clear CCA in a CCA subframe of the one or more CCA subframes in the unlicensed spectrum; and
receiving, by the user equipment, at least one other of: the one or more synchronization signals, or one other system broadcast signal in the CCA subframe in response to detecting the clear CCA.

15. The method of claim 12, wherein the non-CCA subframe in which the at least one of: the one or more synchronization signals, or one or more system broadcast signals, is received is staggered over different carriers.

16. The method of claim 12, wherein the system broadcast signal includes at least one of:
an indication of a frame structure for at least one unlicensed carrier of the base station,
a network identifier,
a bandwidth identifier identifying one of a plurality of available bandwidths associated with the base station,
an indication of a number of carriers in the unlicensed spectrum,
a number of reference signal ports,
one or more parameters associated with a random access procedure,
a system frame number, or,
information related to control channels, wherein the information comprises at least one of a size or a location of the control channels.

17. The method of claim 16, wherein the frame structure is at least one of: a downlink-only frame structure, a mixed downlink/uplink frame structure, or an uplink-only frame structure.

18. The method of claim 12, wherein the user equipment is in communication with the base station having at least one licensed carrier, wherein the user equipment is configured with one of a supplemental downlink (SDL) or carrier aggregation (CA) operation using a carrier in the unlicensed spectrum.

19. The method of claim 12, wherein the at least one of: the one or more synchronization signals, or the system broadcast signal, is a wideband signal spanning more than 1.4 MHz.

20. The method of claim 12, wherein the receiving of the non-CCA subframe is associated with an subframe offset, and the subframe offset is a function of a network identifier.

21. The method of claim 12, further including, in the non-CCA subframe, at least one of:
cell-specific reference signals (CRS);
channel-state information reference signals (CSI-RS);
reference signals for enhanced physical broadcast channel (EPBCH); or
channel user pilot signals (CUPS)/channel user beacon signals (CUBS).

22. The method of claim 12, wherein a duration of an unlicensed band cyclic prefix of the OFDMA communication signals is less than or equal to a normal cyclic prefix associated with communications over licensed spectrum.

23. An apparatus configured for wireless communication, comprising:
at least one processor; and
a memory coupled to the at least one processor,
wherein the at least one processor is configured:
to generate, at a base station configured to transmit orthogonal frequency divisional multiple access (OFDMA) communication signals over at least an unlicensed spectrum, at least one of: one or more synchronization signals, or a system broadcast signal for transmission, wherein a subframe configuration is provided in the unlicensed spectrum including one or more clear channel assessment (CCA) subframes and one or more non-clear channel assessment (non-CCA) subframes;

to determine, by the base station, a non-CCA subframe of the one or more non-CCA subframes in the unlicensed spectrum for transmission of the at least one of: the one or more synchronization signals, or the system broadcast signal; and to transmit, by the base station, the at least one of: the one or more synchronization signals, or the system broadcast signal in the non-CCA subframe.

24. The apparatus of claim 23, wherein the at least one processor is further configured:

to detect, by the base station, a clear CCA in a CCA subframe of the one or more CCA subframes in the unlicensed spectrum; and to transmit, by the base station, at least one other of: the one or more synchronization signals, or one other system broadcast signal in the CCA subframe in response to detecting the clear CCA.

25. The apparatus of claim 23, wherein the non-CCA subframe in which the at least one of: the one or more synchronization signals, or one or more system broadcast signals is transmitted is staggered over different carriers.

26. The apparatus of claim 23, wherein the base station includes at least one licensed carrier, and is in communication with at least one user equipment configured with one of: a supplemental downlink (SDL), or carrier aggregation (CA) operation using a carrier in the unlicensed spectrum.

27. An apparatus configured for wireless communication, comprising:

at least one processor; and a memory coupled to the at least one processor, wherein the at least one processor is configured:

to receive, at a user equipment configured to receive orthogonal frequency divisional multiple access (OFDMA) communication signals over at least an unlicensed spectrum, at least one of: one or more synchronization signals, or a system broadcast signal in a non-clear channel assessment (non-CCA) subframe of one or more non-CCA subframes in the unlicensed spectrum from a base station, wherein a subframe configuration is provided in the unlicensed spectrum including one or more clear channel assessment (CCA) subframes and the one or more non-CCA subframes; and to communicate, by the user equipment, with the base station based on the received at least one of: one or more synchronization signals, or a system broadcast signal.

28. The apparatus of claim 27, wherein the at least one processor is further configured:

to detect, by the user equipment, a clear CCA in a CCA subframe of the one or more CCA subframes in the unlicensed spectrum; and to receive, by the user equipment, at least one other of: the one or more synchronization signals, or one other system broadcast signal in the CCA subframe in response to detecting the clear CCA.

29. The apparatus of claim 27, wherein the non-CCA subframe in which the at least one of: the one or more synchronization signals, or one or more system broadcast signals, is received is staggered over different carriers.

30. The apparatus of claim 27, wherein the user equipment is in communication with the base station having at least one licensed carrier, wherein the user equipment is configured with one of: a supplemental downlink (SDL) or carrier aggregation (CA) operation using a carrier in the unlicensed spectrum.

* * * * *